(12) United States Patent
Bortz

(10) Patent No.: US 7,274,873 B2
(45) Date of Patent: *Sep. 25, 2007

(54) OPTICAL TRANSMISSION SYSTEMS INCLUDING OPTICAL SWITCHING DEVICES, CONTROL APPARATUSES, AND METHODS

(75) Inventor: Michael Bortz, Columbia, MD (US)

(73) Assignee: Corvis Corporation, Columbia, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/863,386

(22) Filed: Jun. 9, 2004

(65) Prior Publication Data

US 2004/0234262 A1 Nov. 25, 2004

Related U.S. Application Data

(63) Continuation of application No. 09/588,526, filed on Jun. 6, 2000, now Pat. No. 6,771,905.

(60) Provisional application No. 60/137,835, filed on Jun. 7, 1999, provisional application No. 60/178,221, filed on Jan. 26, 2000.

(51) Int. Cl.
  H04J 14/00 (2006.01)
  H04J 14/02 (2006.01)
(52) U.S. Cl. .............................. 398/45; 398/48; 398/56; 398/82
(58) Field of Classification Search ................. 398/45, 398/48–51, 55, 56, 93, 82–85
  See application file for complete search history.

(56) References Cited

U.S. PATENT DOCUMENTS

| 4,039,249 | A | 8/1977 | Kaminow et al. |
| 4,725,110 | A | 2/1988 | Glenn et al. |
| 4,728,165 | A | 3/1988 | Powell et al. |
| 4,821,255 | A | 4/1989 | Kobrinski |
| 4,989,200 | A | 1/1991 | Olshansky et al. |
| 5,007,705 | A | 4/1991 | Morey et al. |
| 5,101,450 | A | 3/1992 | Olshansky |
| 5,121,450 | A | 6/1992 | Eichen et al. |

(Continued)

FOREIGN PATENT DOCUMENTS

EP  0638837  2/1995

(Continued)

OTHER PUBLICATIONS

Naohide, Negatsu, et al., Optical Path Accomodation Design Enabling Cross-Connect System Scale Evaluation, IEICE Transactions on Communications, Institute of Electronics Information and Comm., Eng., Tokyo, JP, vol. E78-b, No. 9, Sep. 1, 1995, pp. 1339-1343.

(Continued)

*Primary Examiner*—Dalzid Singh

(57) ABSTRACT

The optical systems of the present invention include optical switching device generally configured to control signal characteristic profiles over the pluralities of signal channels, or wavelengths, to provide desired signal characteristic profiles at the output ports of the device. Various signal characteristics that can be controlled include power level, cross-talk, optical signal to noise ratio, etc. The optical switching devices can include balanced demultiplexer/multiplexer combinations and switches that provide for uniform optical loss through the devices. In addition, low extinction ratio switches can be configured to provide higher extinction ratios.

20 Claims, 20 Drawing Sheets

U.S. PATENT DOCUMENTS

| | | | |
|---|---|---|---|
| 5,126,874 A | 6/1992 | Alfano et al. | |
| 5,134,509 A | 7/1992 | Olshansky et al. | |
| 5,136,670 A | 8/1992 | Shigematsu et al. | |
| 5,159,601 A | 10/1992 | Huber | |
| 5,181,134 A | 1/1993 | Fatehi et al. | |
| 5,191,586 A | 3/1993 | Huber | |
| 5,191,626 A | 3/1993 | Stern | |
| 5,202,786 A | 4/1993 | Boyle et al. | |
| 5,218,651 A | 6/1993 | Faco et al. | |
| 5,268,910 A | 12/1993 | Huber | |
| 5,283,686 A | 2/1994 | Huber | |
| 5,301,058 A | 4/1994 | Olshansky | |
| 5,321,707 A | 6/1994 | Huber | |
| 5,392,154 A | 2/1995 | Chang et al. | |
| 5,400,166 A | 3/1995 | Huber | |
| 5,432,632 A | 7/1995 | Watanabe | |
| 5,446,809 A | 8/1995 | Fritz et al. | |
| 5,452,116 A | 9/1995 | Kirkby et al. | |
| 5,457,556 A | 10/1995 | Shiragaki | |
| 5,475,780 A | 12/1995 | Mizrahi | |
| 5,479,256 A | 12/1995 | Tamai et al. | |
| 5,528,406 A | 6/1996 | Jeffrey et al. | |
| 5,532,855 A | 7/1996 | Kato et al. | |
| 5,532,864 A | 7/1996 | Alexander et al. | |
| 5,570,218 A | 10/1996 | Sotom | |
| 5,579,143 A | 11/1996 | Huber | |
| 5,583,957 A | 12/1996 | Blow | |
| 5,596,436 A | 1/1997 | Sargis et al. | |
| 5,600,473 A | 2/1997 | Huber | |
| 5,608,825 A | 3/1997 | Ip | |
| 5,623,362 A | 4/1997 | Mitsuda et al. | |
| 5,627,925 A | 5/1997 | Alferness et al. | |
| 5,633,961 A | 5/1997 | Kirkby et al. | |
| 5,633,965 A | 5/1997 | Bricheno et al. | |
| 5,636,304 A | 6/1997 | Mizrahi et al. | |
| 5,652,814 A | 7/1997 | Pan et al. | |
| 5,706,375 A | 1/1998 | Mihailov et al. | |
| 5,712,932 A | 1/1998 | Alexander et al. | |
| 5,742,416 A | 4/1998 | Mizrahi | |
| 5,754,320 A | 5/1998 | Watanabe et al. | |
| 5,771,112 A | 6/1998 | Hamel et al. | |
| 5,815,613 A | 9/1998 | Fatehi et al. | |
| 5,889,600 A | 3/1999 | McGuire | |
| 5,903,371 A * | 5/1999 | Arecco et al. | 398/4 |
| 5,933,552 A | 8/1999 | Fukushima et al. | |
| 5,940,551 A | 8/1999 | Oberg | |
| 5,959,750 A | 9/1999 | Eskildsen et al. | |
| 5,970,201 A | 10/1999 | Anthony et al. | |
| 5,974,216 A | 10/1999 | Nakaya | |
| 5,991,476 A | 11/1999 | Baney et al. | |
| 6,049,418 A | 4/2000 | Srivastava et al. | |
| 6,137,604 A | 10/2000 | Bergano | |
| 6,169,616 B1 * | 1/2001 | Cao | 398/9 |
| 6,285,479 B1 * | 9/2001 | Okazaki et al. | 398/56 |
| 6,366,379 B1 * | 4/2002 | Terahara et al. | 398/213 |
| 6,424,445 B1 * | 7/2002 | Tsushima et al. | 398/177 |
| 6,449,073 B1 | 9/2002 | Huber | |
| 6,559,984 B1 * | 5/2003 | Lee et al. | 398/5 |
| 6,771,905 B1 * | 8/2004 | Bortz | 398/45 |

FOREIGN PATENT DOCUMENTS

| | | |
|---|---|---|
| EP | 0849968 | 6/1998 |
| EP | 0851545 | 7/1998 |
| EP | 0851705 | 7/1998 |
| JP | PAJ 10051382 | 2/1998 |
| JP | PAJ 10056661 | 2/1998 |
| WO | WO95/13687 | 5/1995 |
| WO | WO97/06614 | 2/1997 |

OTHER PUBLICATIONS

O'Mahony, M.J., et al., "The Design of a European Optical Network", Journal of Lightwave Technology, IEEE Log No. 9411015, New York, US, May 1, 1995, vol. 13, No. 5, pp. 817-828.

Dumortier, P., et al., "Guidelines for Scalable Optical Telecommunication Networks", Singapore, Nov. 14-16, 1995, New York, IEEE, US, Nov. 14, 1995, pp. 1012-1017.

Stern, T.E., "Linear Lightwave Networks: How Far Can They Go?", Proceedings of the Global Telecommunications Conference and Exhibition(Globecom), US, New York, IEEE, Dec. 2, 1990, pp. 1866-1872.

Labourdette, J.F., "Performance Impact of Partial Reconfigurability in Lightwave Networks", Fourteenth Annual Joint Conference of the IEEE Computer and Communications Societies, Boston Apr. 2-6, 1995, Los Alamitos, IEEE Comp. Soc. Press, US, vol. CONF. 14, Apr. 2, 1995, pp. 683-691.

Yamanaka, N., et al., "Wavelength path network management scheme for multimedia photonic network" IEICE Transactions on Communications, Jul. 1993, Japan, vol. E76-B, No. 7, pp. 731-735.

Hall, K.L. et al., 100 Gb/s All-Optical Logic, OFC '98 Post-Deadline Paper PD5-1-PD5-3.

Janos, M. et al., Transient Transmission Notches Induced in $Er^{+3}$ Doped Optical Fibre Bragg Gratings, p. 245, Electronics Letters, Feb. 1, 1996, vol. 32, No. 3.

Di Pasquale, F. et al., Pump Controlled All-Optical Switching by Using High-Concentration $Er^{+3}$ Doped Nonlinear Waveguides, p. 232-3, Electronics Letters, Feb. 3, 1994, vol. 30, No. 3.

Wey, J.S., et al., Investigation of Dynamic Gratings in Erbium-Doped Fiber for Optical Bit Pattern Recognition, Conference On Lasers And Electro-Optics (CLEO '97), May 18-23, 1997, pp. 443, 444, 1997 OSA Technical Digest Series, vol. 11, Conference Edition.

* cited by examiner

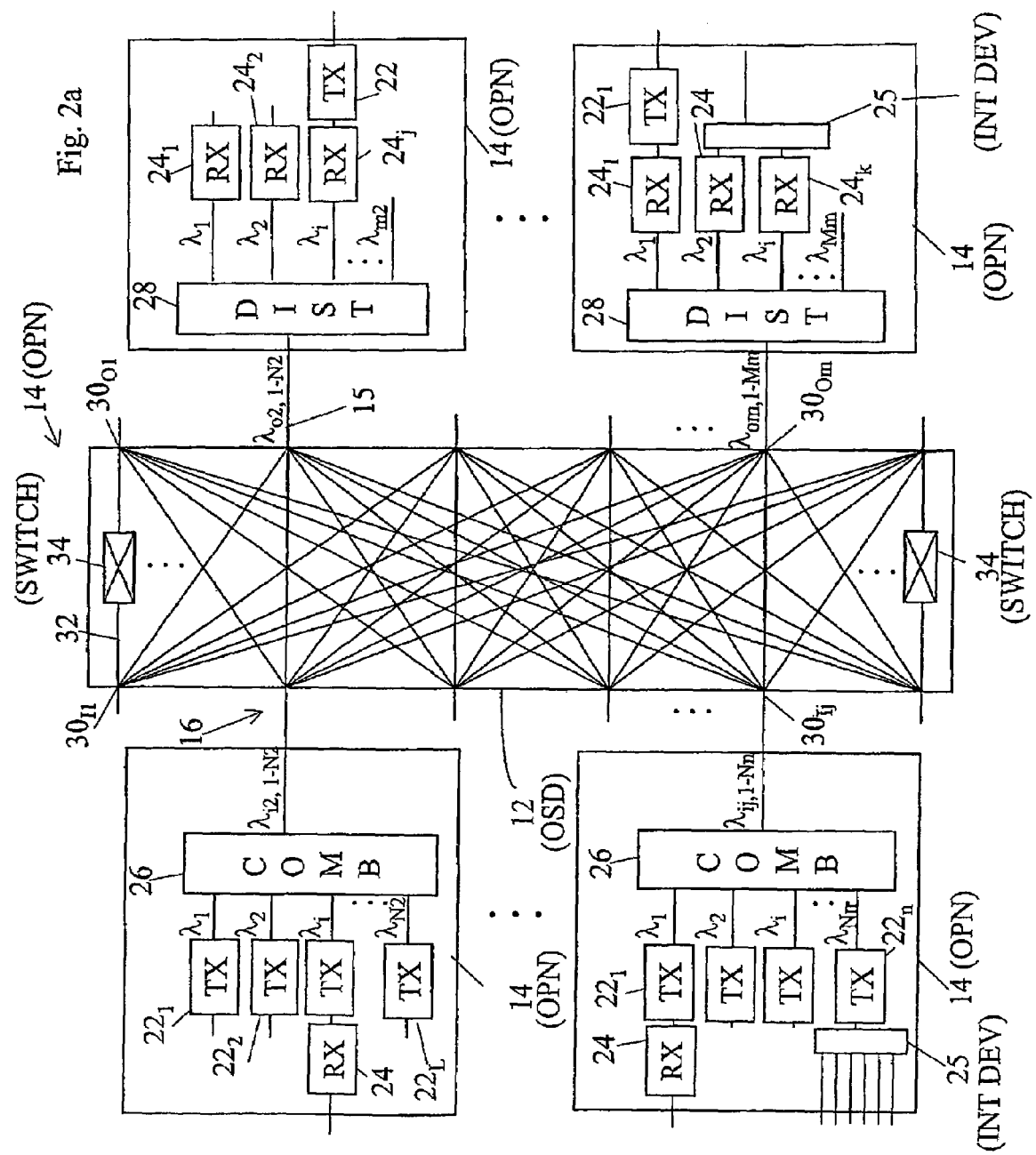

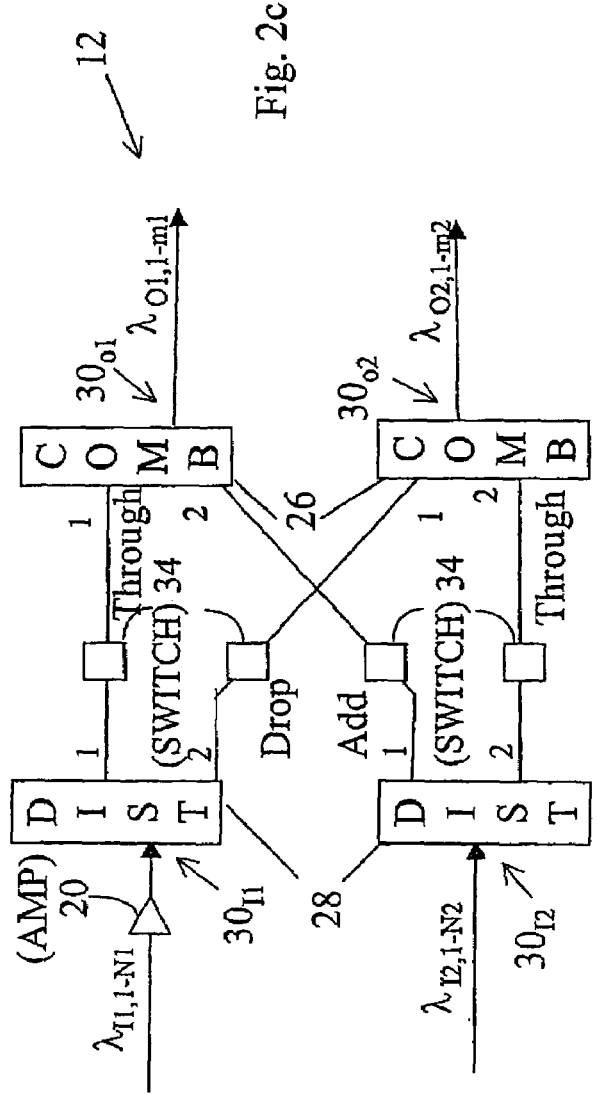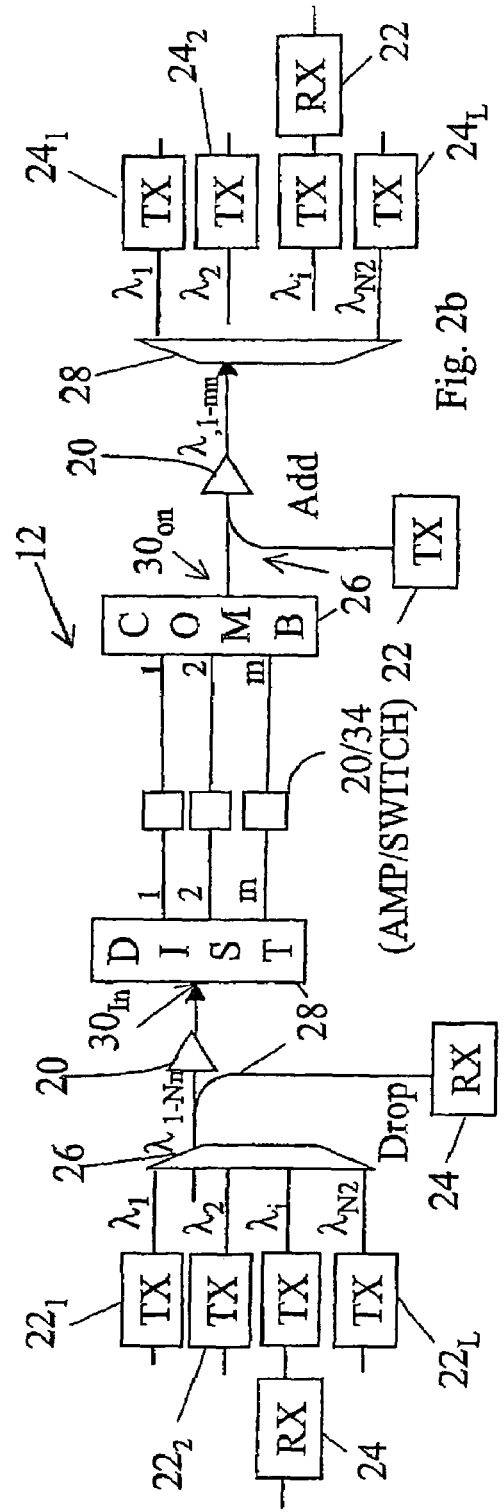
Fig. 2c
Fig. 2b

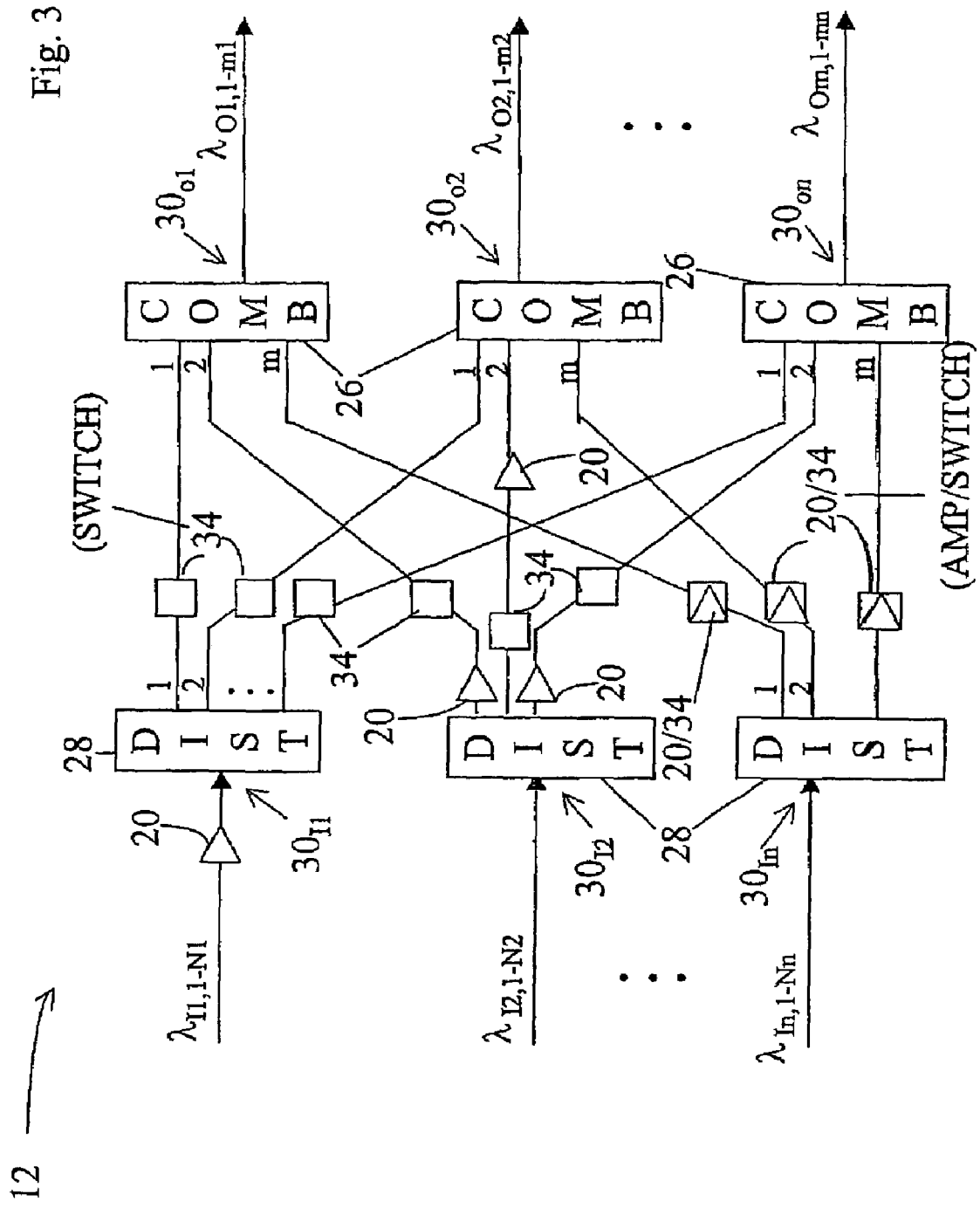

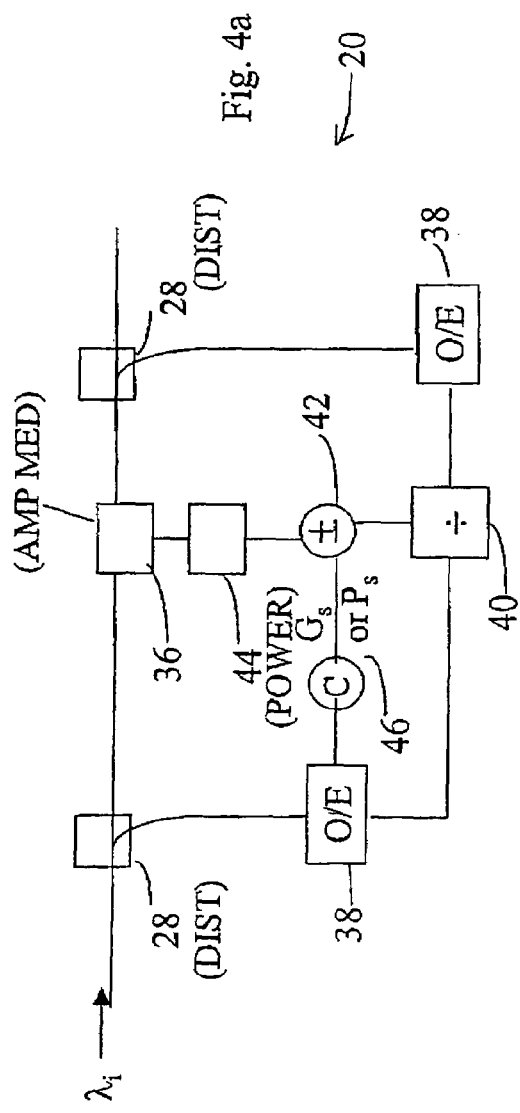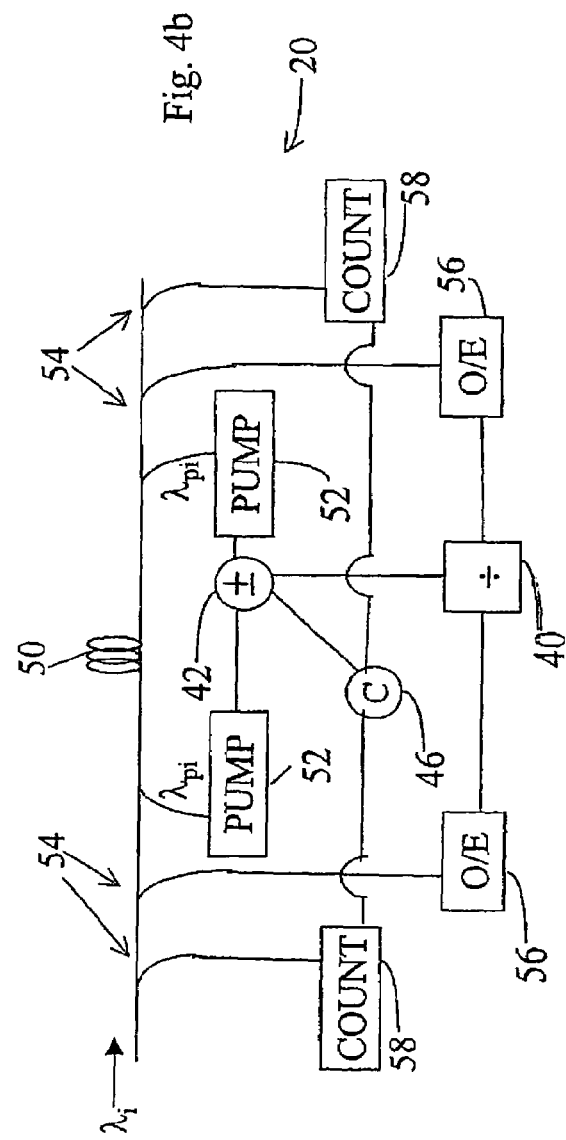

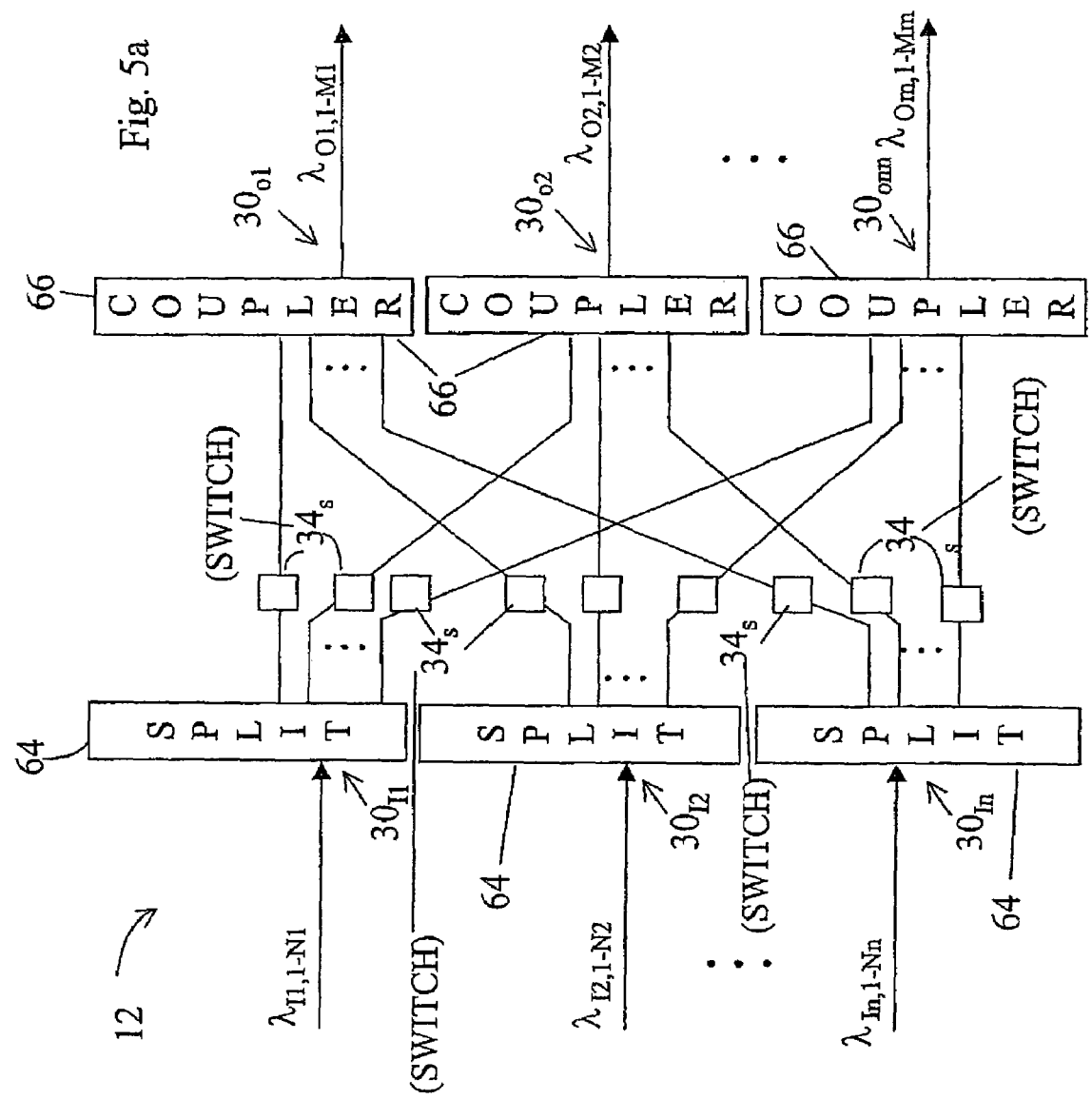

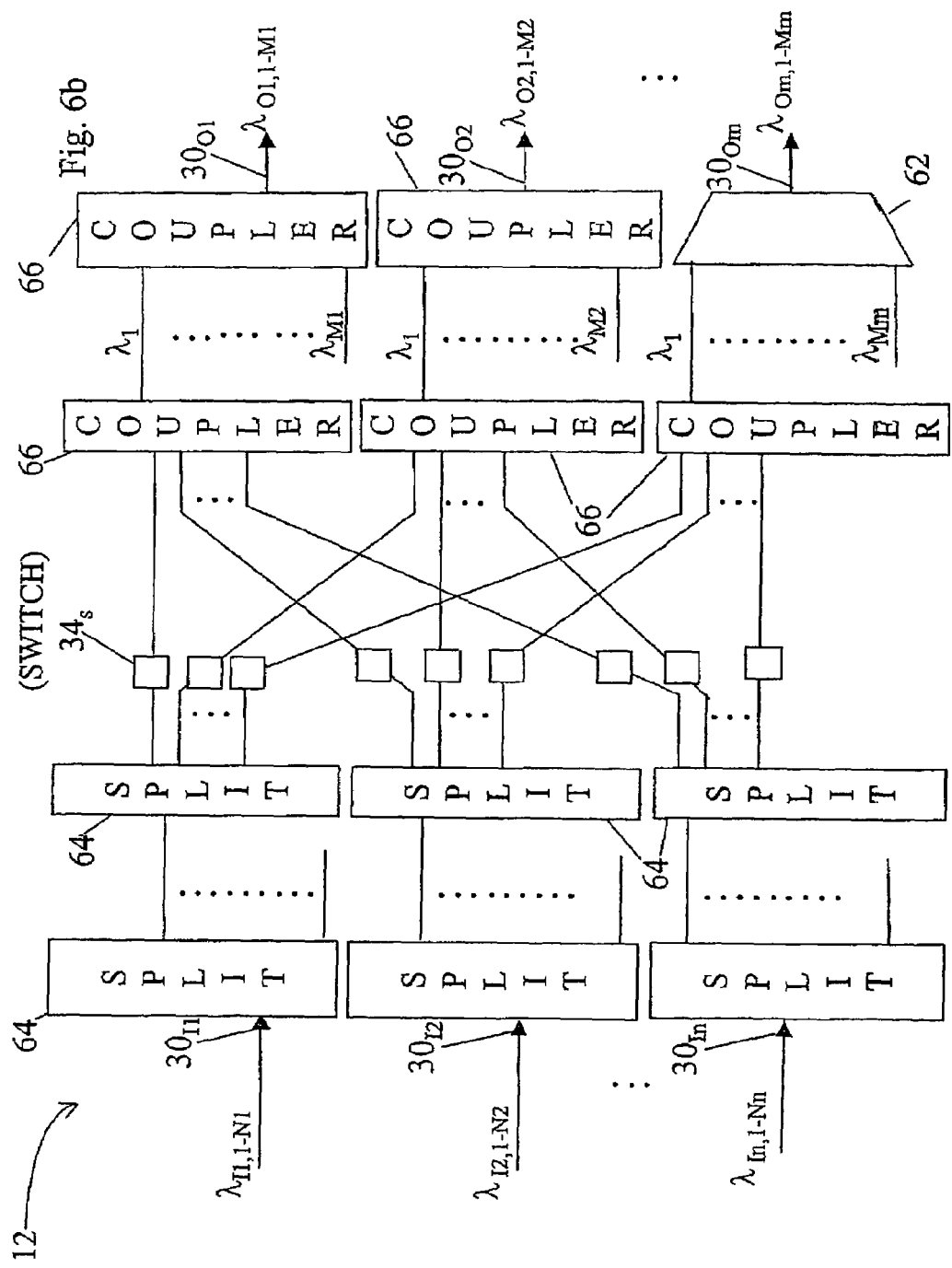

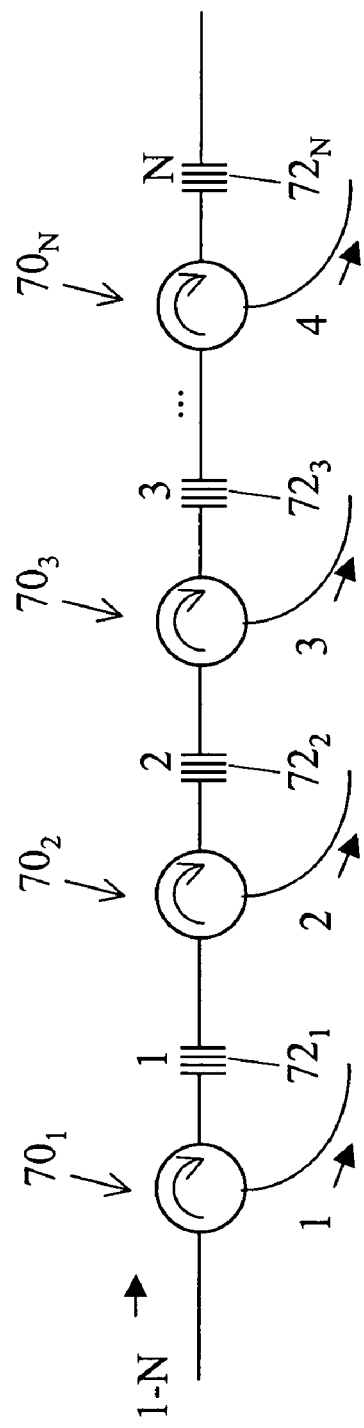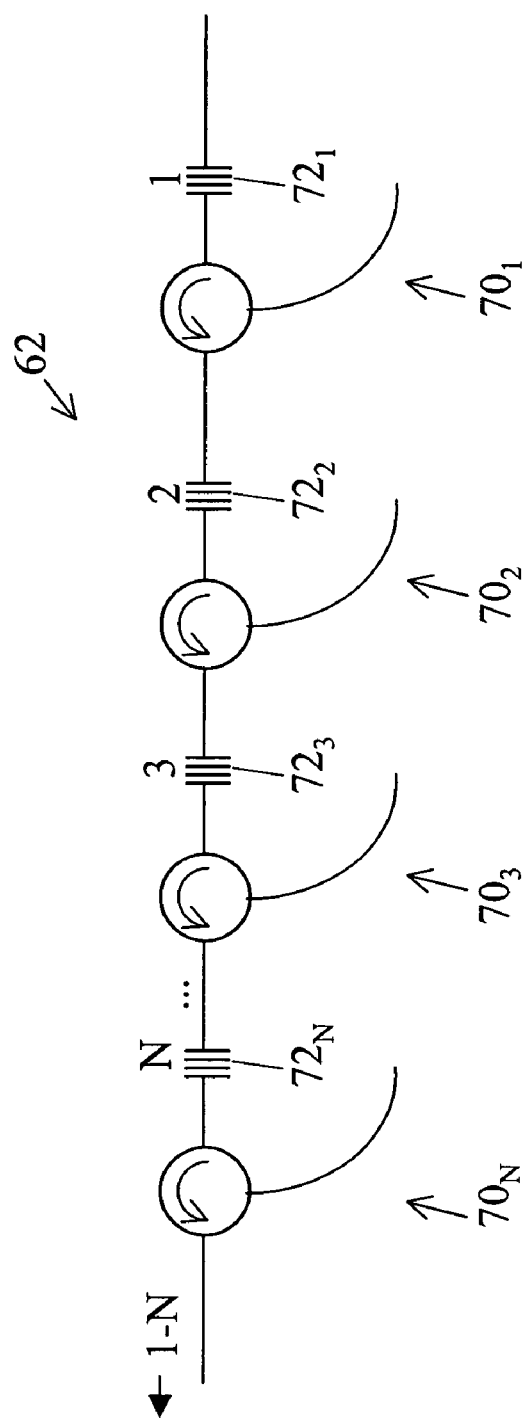

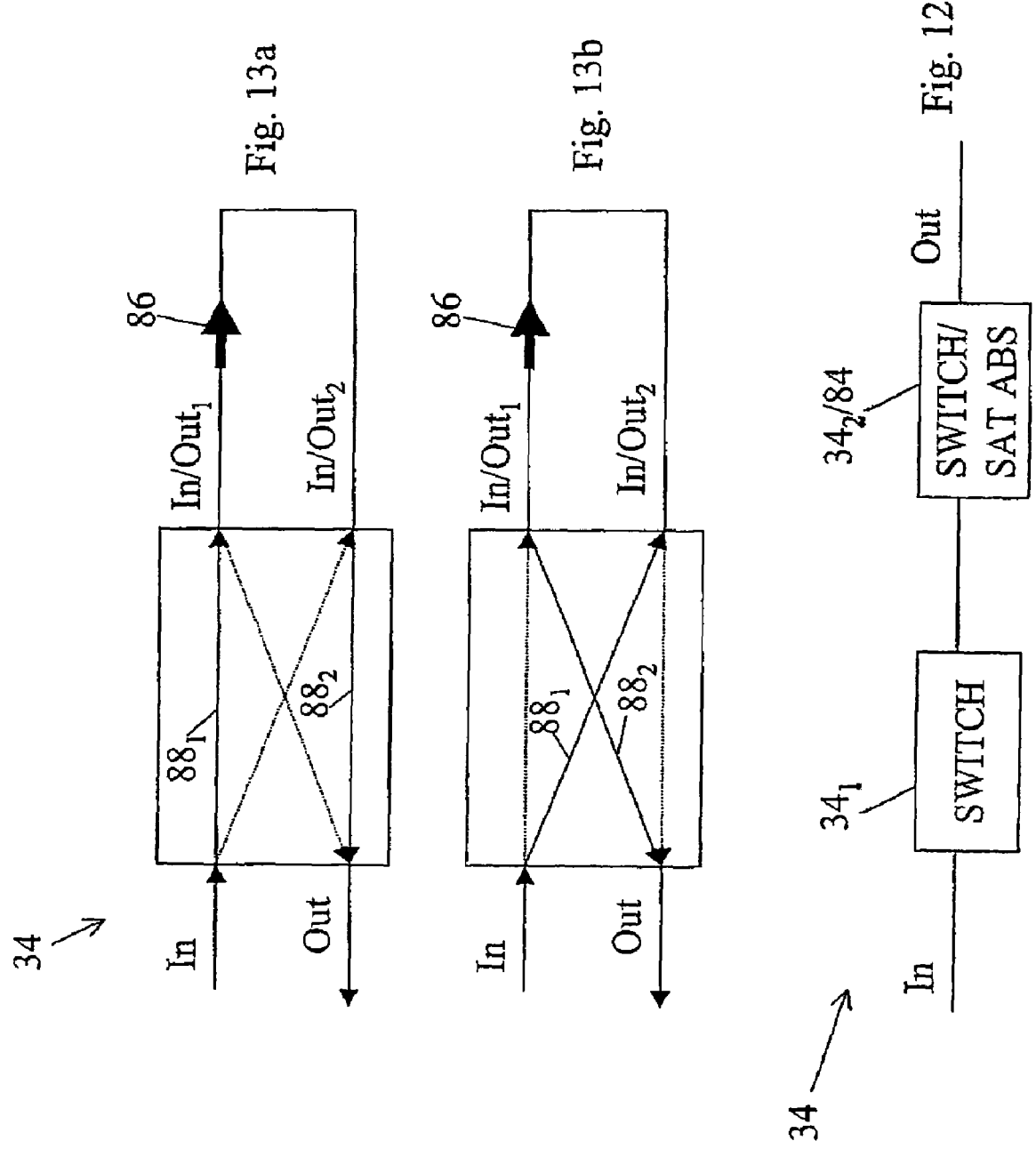

OPTICAL TRANSMISSION SYSTEMS INCLUDING OPTICAL SWITCHING DEVICES, CONTROL APPARATUSES, AND METHODS

CROSS-REFERENCE TO RELATED APPLICATIONS

This application is a continuation of U.S. patent application Ser. No. 09/588,526, filed Jun. 6, 2000 now U.S. Pat. No. 6,771,905, which is a continuation-in-part ("CIP") of, and claims priority from, commonly assigned U.S. Provisional Application Nos. 60/137,835 filed Jun. 7, 1999 and 60/178,221 filed Jan. 26, 2000, all of which are incorporated herein by reference.

STATEMENT REGARDING FEDERALLY SPONSORED RESEARCH OR DEVELOPMENT

Not Applicable

BACKGROUND OF THE INVENTION

The present invention is directed generally to optical transmission systems. More particularly, the invention relates to optical switching devices, such as optical cross-connect switches, routers, add/drop multiplexers, and equalizers for use in optical systems.

Digital technology has provided electronic access to vast amounts of information. The increased access has driven demand for faster and higher capacity electronic information processing equipment (computers) and transmission networks and systems to link the processing equipment.

In response to this demand, communications service providers have turned to optical communication systems, which have the capability to provide substantially larger information transmission capacities than traditional electrical communication systems. Information can be transported through optical systems in audio, video, data, or other signal formats analogous to electrical systems. Likewise, optical systems can be used in telephone, cable television, LAN, WAN, and MAN systems, as well as other communication systems.

Early optical transmission systems, known as space division multiplex (SDM) systems, transmitted one information signal using a single wavelength in separate waveguides, i.e. fiber optic strand. The transmission capacity of optical systems was increased by time division multiplexing (TDM) multiple low bit rate, information signals, such as voice and video signals, into a higher bit rate signal that can be transported on a single optical wavelength. The low bit rate information carried by the TDM optical signal is separated from the higher bit rate signal following transmission through the optical system.

The continued growth in traditional communications systems and the emergence of the Internet as a means for accessing data has further accelerated the demand for higher capacity communications networks. Telecommunications service providers, in particular, have looked to wavelength division multiplexing (WDM) to further increase the capacity of their existing systems.

In WDM transmission systems, pluralities of distinct TDM or SDM information signals are carried using electromagnetic waves having different wavelengths in the optical spectrum, i.e., far-UV to far-infrared. The multiple information carrying wavelengths are combined into a multiple wavelength WDM optical signal that is transmitted in a single waveguide. In this manner, WDM systems can increase the transmission capacity of existing SDM/TDM systems by a factor equal to the number of wavelengths used in the WDM system.

Optical WDM systems are presently deployed as in point-to-point WDM serial optical links ("PTP-WDM") interconnected by electrical signal regeneration and switching equipment. At the electrical interconnection sites in the PTP-WDM systems, all optical signals are converted to electrical signals for processing. Electrical signals can be dropped and/or added at the site or can be regenerated and retransmitted on nominally the same or a different wavelength along the same fiber path or switched to a different fiber path.

As would be expected, it can become extremely expensive to perform optical to electrical to optical conversions in PTP-WDM systems merely to pass signals along to the transmission path. The cost of electrical regeneration/switching in WDM systems will only continue to grow with WDM systems having increasing numbers of channels and transmission paths in the system. As such, there is a desire to eliminate unnecessary, and costly, electrical regeneration and switching of information being transported in optical systems.

Current optical systems already benefit from the use of limited capability, optical switching devices. For example, optical add/drop multiplexers provide optical access to a single transmission fiber to remove selected channels from a WDM signal. Optical add/drop multiplexers eliminate the need to convert all of the optical signals in the transmission fiber to electrical signals, when access to only a portion of the traffic being transmitted as optical signals is required.

As optical system capacity requirements continue to grow with demand, it will become increasingly necessary for optical systems to evolve from point to point optical link toward multidimensional optical networks. Numerous optical switching devices have been proposed as alternatives to electrical switching to enable multidimensional all optical networks. For example, U.S. Pat. Nos. 4,821,255, 5,446,809, 5,627,925 disclose various optical switch devices.

A difficulty with many proposed optical cross-connect switches is that the switches become overly complex with increasing numbers of optical channels and input/output ports. The interconnection of multiple fiber paths, each carrying multiple channels, also becomes extremely difficult to manage effectively.

In addition, the interconnection of multiple fiber paths can introduce additional complications in the system. For example, signal channels being switched between different fiber paths can have different power levels that introduce channel to channel power variations in optical paths exiting the optical switching devices. The power variations in optical switching devices are particularly troublesome, because the variations can propagate through numerous optical paths and degrade the performance throughout a portion of the system.

In addition, optical switching devices can also impose significant optical losses on the signal channels passing through the devices. As the number of ports, i.e., size, and functionality of the optical switching devices increases, it generally becomes necessary to amplify the signal channels to overcome splitting losses and other losses in the optical switching device. However, optical amplification to overcome losses associated with optical switching devices can further introduce variations in the signal channels passing through an optical amplifier.

Typically, optical amplifiers automatically control the characteristics of signal channels passing through the optical amplifier using either Automatic Power Control (APC) or Automatic Gain Control (AGC) schemes. In APC schemes, the amplifier gain will be varied according to the APC scheme to maintain the total output of the optical signal exiting the amplifier within a constant power range. As a result, if the number of channels varies, the individual signal channel powers can vary in APC schemes. In AGC schemes, the amplifier gain is maintained within a constant gain range. Therefore, if the signal channel powers or the number of signal channels varies, then the total output power of the optical signal channel will vary as the overall gain of the amplifier is maintained within its constant gain range. As with APC schemes, the individual signal channel powers can vary in AGC schemes.

Traditional AGC and APC schemes are typically not effective in optical switching device configurations. The ineffectiveness is because signal channels are often combined from multiple input optical paths, which can have different signal powers. Thus, while the signal channels in any given input optical path may be controlled, variations in signal power between the input paths can cause signal channel power variations in one or more of the output optical paths.

Signal channel power variations also can be inherently produced as a result of the optical switching device design. The various processes performed in the devices, such as demultiplexing, splitting, switching, adding, dropping, coupling, and multiplexing of various signal channels can each introduce variations in the signal channel power levels.

For example, in many optical systems and component designs it is common to include symmetrically designed demultiplexers and multiplexers. The symmetrical demux/mux construction provides for streamlined manufacturing of the products and the potential for bi-directional use in bi-directional systems. However, symmetrical demux/mux configurations can produce signal channel power variations, if deployed with all optical switching devices.

Analogously, dissimilar demux/mux configurations are often deployed in various optical switching devices. For example, wavelength selective demultiplexers can be used with non-wavelength selective combiners, such as N:1 couplers. These configurations can also introduce signal channel power variations.

Depending upon the number of channels in the WDM system, one or more stages of non-wavelength selective splitting and combining can be used along with various filtering techniques applied to each wavelength. For example, see U.S. Pat. No. 5,446,809 (the "'809 patent"), which is incorporated herein by reference. Unfortunately, as the number of channels in WDM systems continues to increase, non-wavelength selective splitting and coupling can become impractical even when optical amplification is used to overcome the passive losses.

Another source of signal channel degradation in optical switching devices occurs when the switches incompletely block signal channels, thereby allowing leakage of unwanted signal channels through the device. Leakage of unwanted signal channels will degrade the signal quality of the signal channels being passed through the devices by creating cross-talk interference. Significant levels of cross-talk can destroy the information carried by signal channels being passed through the device. The amount of crosstalk that occurs through an on/off switch can be characterized by the extinction ratio of the switch, which is the ratio of power transmitted through the switch in the on state over the off state.

There are numerous types of optical switches, or gates, such as mechanical, thermo-, acousto-, and electro-optic, doped fiber and semiconductor gates, and tunable filters, that are available for use in optical switching devices. Thermo-, acousto-, and electro-optic switches are appealing, because of the relatively low cost and solid state characteristics. However, these switches often have extinction ratios only on order of ~20 dB. The low extinction ratios can introduce unacceptable levels of cross-talk in optical systems. As such, these types of switches are typically limited to use in systems in which minor signal degradation can be tolerated or the degradation does not accumulate from multiple switches.

Conversely, mechanical line or mirror switches can have excellent extinction ratios, but the moving parts associated with mechanically moving and aligning the switch can pose a reliability problem over the long term. Doped fiber and semiconductor on/off gates can provide good extinction, but require active components to maintain the gate configurations, which increases cost and decreases reliability. Tunable filters can also provide good extinction ratio in a switch mode, but the filters may require active components that have maintainable, stable tuning characteristics.

The various signal degradation mechanisms that can be introduced in an optical system by prior art optical switching devices have been a contributing factor to the industry's inability to develop and deploy reliable optical switching devices to enable the creation of all-optical, or "transparent", networks. Accordingly, there is a need for optical systems including optical amplifiers and optical switching devices that provide increased control over signal channels being switched, or routed, through the system.

As the need for high capacity WDM systems continues to grow, it will become increasingly necessary to provide all optical networks that eliminate the need for and expensive of electrical regeneration to perform signal routing and grooming in the networks. The development of multi-dimensional, all-optical networks will provide the cost and performance characteristics required to further the development of high capacity, more versatile, longer distance communication systems.

BRIEF SUMMARY OF THE INVENTION

The apparatuses and methods of the present invention address the above need for higher performance optical systems. Optical systems of the present invention generally include at least one optical processing device, such as optical cross-connect switches and routers, as well as add/drop multiplexers, disposed along an optical path between transmitting and receiving optical processing nodes.

Optical signals from the transmitting nodes pass through the optical switching devices via input and output ports to the receiving nodes. In various embodiments, the optical switching device includes optical amplifiers, such as EDFAs, configured to provide automatic gain & power control (AGPC) over the output power of signal channels passing through the optical amplifier. AGPC allows signal channels from diverse optical paths to be combined without incurring a substantial performance penalty due to non-uniform signal power levels in the combined signal channels.

The optical switching devices generally are configured to control the signal characteristic profile over the pluralities of signal channels, or wavelengths, and provide a desired signal characteristic profile at the output ports of the switching devices. Various signal characteristics controlled in the devices include power level, cross-talk, optical signal to noise ratio, etc. The optical switching devices can include balanced demultiplexer/multiplexer combinations and switches that provide for uniform optical loss and provide for variable power control of the signal channels passing through the devices. In addition, low extinction ratio switches can be configured to provide higher extinction ratio switching devices.

Accordingly, the present invention addresses the aforementioned needs by providing optical systems, apparatuses, and methods with increased control over signal channels being combined from different optical paths. These improvements provide for the use of optical switching devices in optical systems without incurring a substantial decrease in the performance of the system. These advantages and others will become apparent from the following detailed description.

BRIEF DESCRIPTION OF THE DRAWINGS

Embodiments of the present invention will now be described, by way of example only, with reference to the accompanying schematic drawings for the purpose of illustrating embodiments only and not for purposes of limiting the same, wherein:

FIGS. 1–2c illustrate exemplary optical systems including exemplary optical switching devices;

FIG. 3 illustrates an exemplary optical switching device;

FIGS. 4a–4b illustrate exemplary optical amplifier configurations;

FIGS. 7a–9b illustrate exemplary demultiplexer and multiplexer configurations;

FIGS. 12–14 illustrate exemplary optical switch elements.

DESCRIPTION OF THE INVENTION

Figure 1:
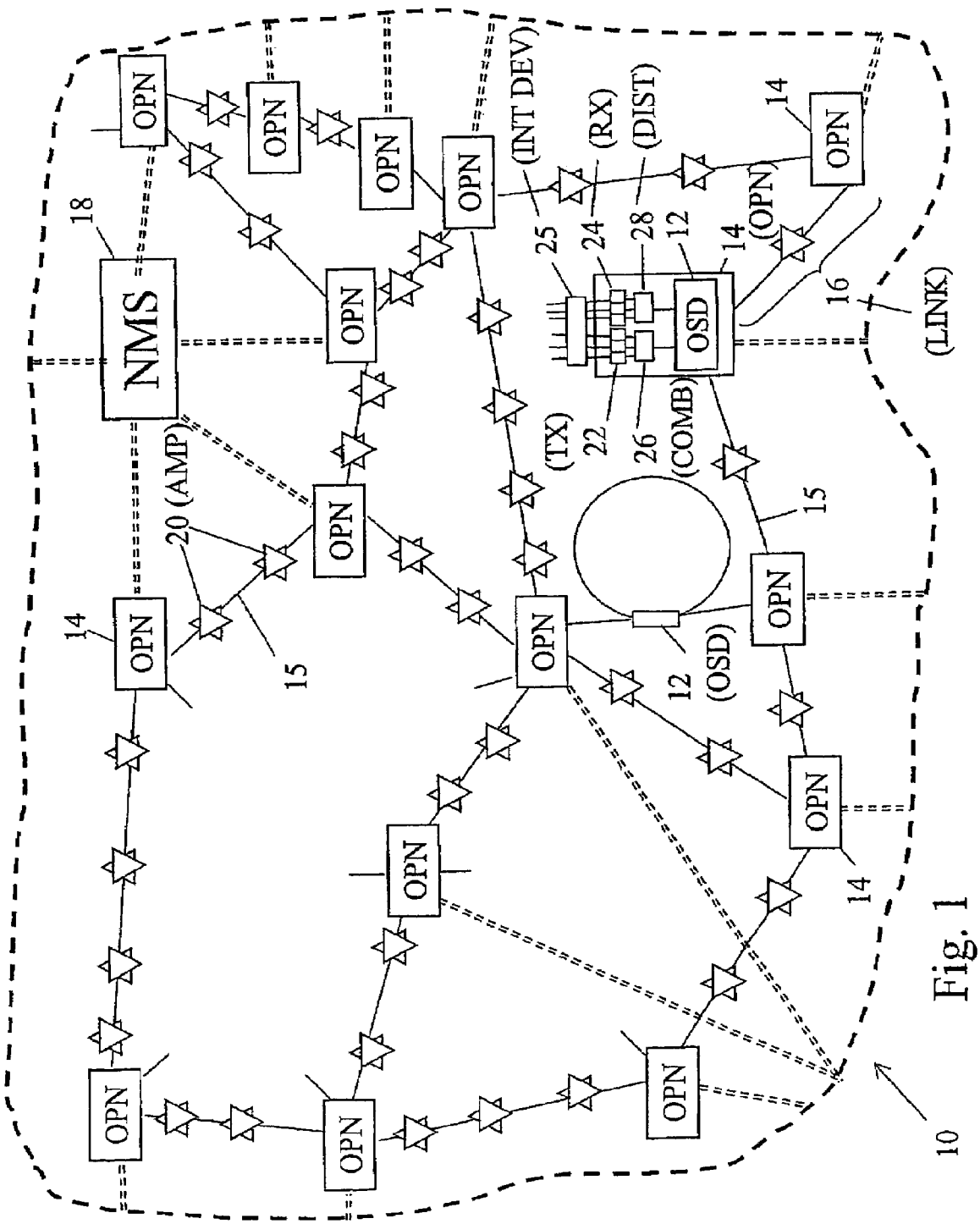

Optical systems 10 of present invention include at least one optical switching device 12 interconnecting two or more other optical processing nodes 14. Various guided or unguided transmission media, such as optical fiber 15, can provide an optical link 16 allowing for optical communication between the nodes 12. The optical switching devices 12 generally include optical routers, optical cross-connect and line switches, add/drop devices, and other devices interconnecting optical fibers that provide the optical links 16. In the context of the present invention, an optical switching device 12 receives an optical signal at an input port and can pass or substantially block the passage of one or more optical signal wavelengths, or signal channels, $\lambda_i$ included in the optical signal to an output port, without converting the optical signal to electrical form.

The system 10 can be configured in various linear and multi-dimensional architectures (FIG. 1) and controlled by a network management system 18. One or more optical amplifiers 20 can be disposed periodically along the optical links 16, e.g., every 20–120 km, to amplify attenuated optical signals during transmission between nodes 14 and/or proximate to other optical components to provide gain to overcome component losses. One or more optical fibers can be disposed to provide multiple optical link 16 between nodes 14 along a common optical path. In addition, each fiber can carry uni- or bi-directionally propagating optical signals depending upon the system 10 configuration.

Generally, the optical processing nodes 14 can include one or more optical transmitters 22 and optical receivers 24, as well as optical switching devices 12. Various combinations of optical switching devices 12, transmitters 22, and receivers 24 can be included in each processing node 14 depending upon the desired functionality in the nodes 14.

The optical transmitters 22 and optical receivers 24 are configured respectively to transmit and receive optical signals including one or more information carrying optical signal wavelengths, or signal channels, $\lambda_i$. In the present description, the term "information" should be broadly construed to include any type of information that can be optically transmitted including voice, video, data, instructions, etc.

The transmitters 22 used in the system 10 generally will include a narrow bandwidth laser optical source, such as a DFB laser, that provides an optical carrier. The transmitters 22 also can include other coherent narrow or broad band sources, such as sliced spectrum or fiber laser sources, as well as suitable incoherent optical sources as appropriate. Information can be imparted to the optical carrier either by directly modulating the optical source or by externally modulating the optical carrier emitted by the source. Alternatively, the information can be imparted to an electrical carrier that can be upconverted onto an optical wavelength to produce the optical signal. The information can be amplitude, frequency, and/or phase modulated using various formats, such as return to zero ("RZ") or non-return to zero ("NRZ") and encoding techniques, such as forward error correction ("FEC").

The optical receiver 24 used in the present invention will be configured to correspond to the particular modulation format used in the transmitters 22. The receiver 24 can receive the signals using various detection techniques, such as coherent detection, optical filtering and direct detection, and combinations thereof. Employing tunable transmitters 22 and receivers 24 in the optical nodes 14 in a network, such as in FIGS. 1–3, can provide additional versatility in configuring the network architecture of the system 10.

The transmitters 22 and receivers 24 can be also connected to interfacial devices 25, such as electrical and optical cross-connect switches, IP routers, etc., to provide interface flexibility within, and at the periphery of, the optical system 10. The interfacial devices 25 can be configured to receive, convert, and provide information in one or more various protocols, encoding schemes, and bit rates to the transmitters 22, and perform the converse function for the receivers 24. The interfacial devices 25 also can be used to provide protection switching in various nodes 14 depending upon the configuration.

Optical combiners 26 can be used to combine the multiple signal channels into WDM optical signals. Likewise, optical distributors 28 can be provided to distribute the optical signal to the receivers $24_j$. The optical combiners 26 and distributors 28 can include various multi-port devices, such as wavelength selective and non-selective ("passive"), fiber and free space devices, as well as polarization sensitive devices. For example, circulators, passive, WDM, and polarization couplers/splitters, dichroic devices, prisms, diffraction gratings, arrayed waveguides, etc. can be used alone or in various combinations along with various tunable or fixed wavelength transmissive or reflective, narrow or broad band filters, such as Bragg gratings, Mach-Zehnder, Fabry-Perot and dichroic filters, etc. in the optical combiners 26 and distributors 28. Furthermore, the combiners 26 and distributors 28 can include one or more stages incorporating various multi-port device and filter combinations to multiplex, demultiplex, and/or broadcast signal channels $\lambda_i$ in the optical systems 10.

As shown FIG. 2a, the optical switching device 12 can be embodied as an optical router, or cross-connect switch, including a plurality of input ports $30_I$ and output ports $30_O$. In FIG. 2a, the device 12, transmitters 22 and receivers 24 are shown as separate nodes for convenience. It will be appreciated that devices 12, the transmitters 22 and receivers 24 can be located in different or the same physical node 14 depending upon the system configuration. The device 12 is shown with each of the input ports $30_I$ and output ports $30_O$ optically connected via an optical switch path 32 and a switch element 34 disposed along one of the optical switch path 32. It will be appreciated that device 12 can include multiple optical switch paths between input and output ports and that some input and output ports may not be optically connected.

The switch element 34 will generally be disposed along each optical switch path 32 connecting the input and output ports to allow selective passage or blockage of the optical signals in the optical switch paths 32. The switch element 34 can include wavelength selective or non-selective on/off gate switch elements, as well as variable optical attenuators configured to have a suitable extinction ratio as will be further discussed. The switch elements 34 can include signal path, as well as multiple path elements employing polarization, interferometry, or other effects to perform the gating and/or variable attenuation function. Wavelength selective switch elements $34_s$ can be used with various types of distributors 28 and combiners 26. Whereas, non-selective switch elements $34_{ns}$ will generally require some level of demultiplexing in the distributors 28, unless only optical line switching is performed.

The optical switching device 12 can be configured to selectively switch and route signal groups that may include individual signal channels and/or groups of signal channels including up to all of the signal channels in an optical signal $\lambda_{I,1-N}$ or line switch the optical signal provided to the input port $30_I$ to one or more of the output ports $30_O$. Optical switching devices 12, such as cross-connects, routers, and add/drop multiplexers, that can be used to switch and route groups of signal wavelengths, or signal channels, are described U.S. patent application Ser. No. 09/119,562, which is incorporated herein by reference.

The devices 12 can be configured to perform various other functions, such as signal group filtering, power equalizing, adding telemetry and markers to the signal channels, etc., in the system 10. In various embodiments, the switch elements 34 can include binary on/off gates in combination with variable attenuators or variably attenuating on/off gates. Variable attenuation in combination with optical amplification and on/off switching in the switch elements 34 provide for channel filtering and power equalization, or gain trimming, of the signal group power passing through the device 12. In various embodiments, variable optical attenuators, such as those commercially available from JDS-Uniphase, Inc., can be used to variably control the signal group output power from the switch element 34 to provide for gain equalization with binary on/off gates. Alternatively, optical amplifiers 20 can be configured to operate as variably attenuating on/off gates, as will be further described.

As shown in FIG. 2b, the devices 12 can be deployed in 1×1, in addition to N×M, configurations along the optical link 16 to provide signal group/channel filtering and equalization. In 1×1 configurations, the distributor 28 can demultiplex optical signals into respective signal groups that can be separately filtered or equalized by the switch elements 34 before being recombined into an output signal, as will be further described.

In addition, distributors 28 and combiners 26, typically passive splitters and couplers, respectively, can be provided on the input and output to provide drop access for receiving the channels from the fiber 16 and/or to add channels to the fiber 16. The switch elements 34 in the device 12 can be configured to substantially block or pass those channels that were received from the drop access depending upon whether wavelengths are being reused or multicast. Similarly, the switch elements 34 can be configured to block wavelengths including the same signal channels as those being added to the system 10 after the device 12. It will be appreciated that wavelength selective add and/or drop multiplexers also can be used along with the device 12 or the device 12 can be configured to provide dedicated add/drop channels. However, some wavelength selective add/drop embodiments can limit the flexibility in reconfiguring the system 10.

Alternatively, the device can be configured in 2×1, 2×2 (FIG. 2c), and 1×2 configurations to accommodate adding and/or dropping of signal channels using the device 12. Optical transmitters 22 and/or receivers 24 can be respectively coupled to the input port $30_I$ and output port $30_O$ to selectively add and/or drop signal channels using the device 12. The distributors 28 can include various combinations of passive splitters, filters, and demultiplexers to provide the input signals to the switch elements 34, as will be further described.

In the various add/drop embodiments of the devices 12, the drop receivers 24 and add transmitters 22 can be locally or remotely located from the switching device 12. In various embodiments, add and drop ports of the device 12 can be directly connected with a local system, such as a ring, as shown in FIG. 1. In addition, tunable transmitters 22 and receivers 24 are particularly advantageous in add/drop configurations of the device 12. In these embodiments, the device 12 can be dynamically reconfigured along with the transmitter and receiver wavelengths to reconfigure the signal channel plan of the system 10.

Optical switching devices 12, particularly those having output ports $30_O$ provided with signal channels from multiple input ports $30_I$, can significantly impact the performance of the system 10. For example, variations in signal channel power in the combined optical signals can affect the performance of optical amplifiers 20 and receivers 24 disposed along the optical link 16 connected to the output ports $30_O$. Therefore, it is important to control the signal channel power levels $\lambda_i$ not only within each optical signal provided to device 12, but across all optical signals that pass through the device 12 to output fibers $30_O$.

The devices 12 may include one or more amplifiers 20 in various configurations relative to the input and output port 30 to overcome optical losses associated with the optical switching devices 12, in addition to along the optical link 16. For example, it may be necessary to amplify the signal channels to overcome splitting losses in the devices 12 having multiple output ports $30_I$ to which the signal channels may be multicasted.

As shown in FIG. 3, the optical amplifiers 20 can be located before or after the distributor 28 or switch elements 34. The optical amplifiers 20 can also be incorporated as the switch elements 34 to provide consolidated amplification, on/off switching, and variable attenuation of signals passing the device 12. For example, in the "off" state/position, an unpumped erbium doped fiber amplifier will absorb optical energy, thereby blocking signal channels $\lambda_i$ from passing through the switch element 34 to the output port 30$_O$. Whereas, in the "on" state/position, an optically pumped EDFA will amplify the signal channels $\lambda_i$, thereby serving as an amplifier and on/off gate passing the signal channels $\lambda_i$ to the output port. Furthermore, the pump supplied to the optical amplifier can be variably controlled to not only turn the gate on, but to control the output power of the signal group from the switch element. The consolidated functionality of the optical amplifiers 20 as switch elements 34 provides for signal channel power equalization and channel filtering in 1×1 and N×M configurations of the device 12. In addition, telemetry and device identifier information, etc. can be received and/or imparted to the signal channels passing through the device 12 by imparting information onto the pump power being supplied to the amplifier 20.

Optical amplifiers 20 in the device 12 can be disposed between the input and output ports and configured to provide automatic gain & power control (AGPC) over the output power of signal channels $\lambda_i$ passing through the optical amplifier 20. By controlling the signal channel output power and the loss in the device 12, the performance of the overall system 10 can be maintained, when signal channels from multiple paths are combined using the device 12.

In various embodiments, the gain of the amplifier 20 is controlled based a gain set point $G_s$, which itself can be fixed or controlled based on the number of signal channels in the optical signal and the input power of the signal channels. As generally shown in FIG. 4a, optical signal distributors 28, such as optical taps, can provided before and/or after an amplifying medium 36 to monitor the input and output signal channel powers. The distributors 28 are optically connected to respective optical to electrical converters 38 that can be configured to provide electrical signals corresponding to the signal channel input and output powers and the number of signal channels.

The amplifier gain can be calculated from the input and output power using a divider circuit 40, which can then be compared to the gain set point $G_s$ for the optical amplifier 20 using a comparator circuit 42. The output of the comparator circuit 42 is used to control the power supplied to the optical amplifier 20 by a power source 44, typically by controlling the drive current to the power source 44. A central processor 46 can be used to reset the gain set point $G_s$ based on the amplifier input power and the number of signal channels passing through the amplifier 20.

Alternatively, the amplifier gain performance can be calibrated as a function of the power supplied by the power source 44 and the input power and the number of signal channels. The overall input power would be detected and compared in the comparator 42 to an input power set point $P_s$. The output of the comparator circuit 42 would again be used to control power provided by the power source 44. The central processor 46 calculates the number of signal channels passing through the amplifier based on an expected range of per channel power levels and resets the input power set point $P_s$ to accommodate variations in the number of signal channels. Similar configurations can be provided based on monitoring the signal power at the amplifier output. While the amplifier control loops generally have been described in an analog fashion; digital implementations of the control loop can also be employed.

FIG. 4b illustrates a more specific exemplary embodiment of the optical amplifier 20 including an amplifying fiber 50, such as an erbium doped fiber amplifier, supplied with optical energy from pump sources 52. The pump sources 52 can provide optical energy, "pump power" in one or more pump wavelength $\lambda_{pi}$, which are counter-propagated and/or co-propagated with signal channels $\lambda_i$. For example, pump power in the 980 nm and/or 1480 nm wavelength ranges can be provided to the erbium doped fiber 50 to amplify signal channels in the 1550 nm range.

Passive couplers 54, such as high ratio optical taps, can be used to split a percentage of the optical signal to photodiodes 56 provide an electrical signal corresponding to the optical signal power to the central processor 46. Signal channel counting devices 58 can be used at the input and/or output of the amplifier 20 to determine the number of signal channels passing through the amplifier 20. The central processor 46 controls the gain and power set points, $G_s$ and $P_s$, based on the number of channels and the optical signal power. The central processors 46 also can compare the channel information from the signal counting devices 58 with channel information from the network management system 18 to verify system performance and take appropriate actions, if discrepancies occur.

Signal channel counting devices 58 can be embodied as one or more photodiodes 56 with fixed or tunable filters or as optical spectrum analyzers configured to count the number of signal channels. The counting devices 58 also can be configured to provide the individual signal channel power levels. Alternatively, the number of signal channels also can be transmitted along with the signal channels. In these embodiments, the counting devices 58 also can include an optical or electrical filter to separate the signal channel number identifier signal. For example, the number of signal channels could be transmitted on a low frequency tone to allow it to be detected separately from the signal channels and with lower cost electronics. A single tone could be used to indicate the number of channels, or each channel could have its own channel identifier tone. In addition, the number of signal channels can be transmitted on a separate wavelength or in the overhead information carried by the signal channels. Channel identification information also can be included along with the system supervisory information that is transmitted to each network element, i.e., amplifiers 20, nodes 14, etc. and/or calculated from the total power.

In accordance with present invention, if the number of signal channels passing through the amplifier 20 increases or decreases, the AGPC loop will initially act to maintain the gain of the amplifier 20 at the gain set point $G_s$. Contemporaneously, the central processor 46 will detect a change in the number of signal channels and the input power and adjust the gain set point $G_s$ to maintain the desired output power for the signal channels exiting the amplifier 20. Additionally, if the signal channel input powers vary and the number of signal channels remains constant, the central processor 46 will adjust the gain set point to maintain the desired signal channel output power. Thus, signal channels from diverse optical paths can be combined with minimal performance penalty due to non-uniformly amplified signal channels.

Furthermore, when channel identifier tones are used, the amplifier control scheme can be synchronized to minimize unnecessary changes to the amplifier set points. For example, the number of channels passing through the amplifier can be verified as described before the gain or power is varied in response to detected power variations.

Non-uniformities also can be introduced across the signal channel $\lambda_i$ range, because of varying optical losses that can occur in the distributors 28, combiners 26, and switch elements 34 used in the devices 12. The variations are often introduced because the wavelength selective devices used to separate WDM signals generally exhibit different performance in terms of extinction ratios, loss, and other properties between transmission and reflection. As such, prior devices can introduce signal channel power variations that can degrade system performance.

In the present invention, optical switching devices 12 includes demultiplexers 60, multiplexer 62, and passive splitter 64 and couplers 66 that are configured in various combinations along with the switch elements 34 to balance the optical loss over the signal channel $\lambda_i$ range. The distributors 28 and combiners 26 can be deployed as one or more stages in various configurations depending upon the desired device 12 characteristics including whether wavelength selective switch elements $34_s$ or non-selective ("non-selective") switch elements $34_{ns}$ are used. FIGS. 5a–6d depict exemplary embodiments of the devices 12.

In FIG. 5a embodiments, passive splitters 64 are provided at the input ports $30_{Ii}$ of the device 12 to passively split the input signals $\lambda_{Ii,1-Ni}$ and provide the entire input signal to each output port, or a subset thereof, via the associated selective switch element $34_s$ and combiners 26. Passive couplers 66 can be provided at the output ports $30_{oi}$ to combine the signals passing through selective switch elements $34_s$. Output signals $\lambda_{oi,1-mi}$ are provided at each output port $30_{oi}$ for further transmission along the optical path or provided to receiver 24 collocated with the device 12 at combined switching and destination nodes 14.

Figure 5B:
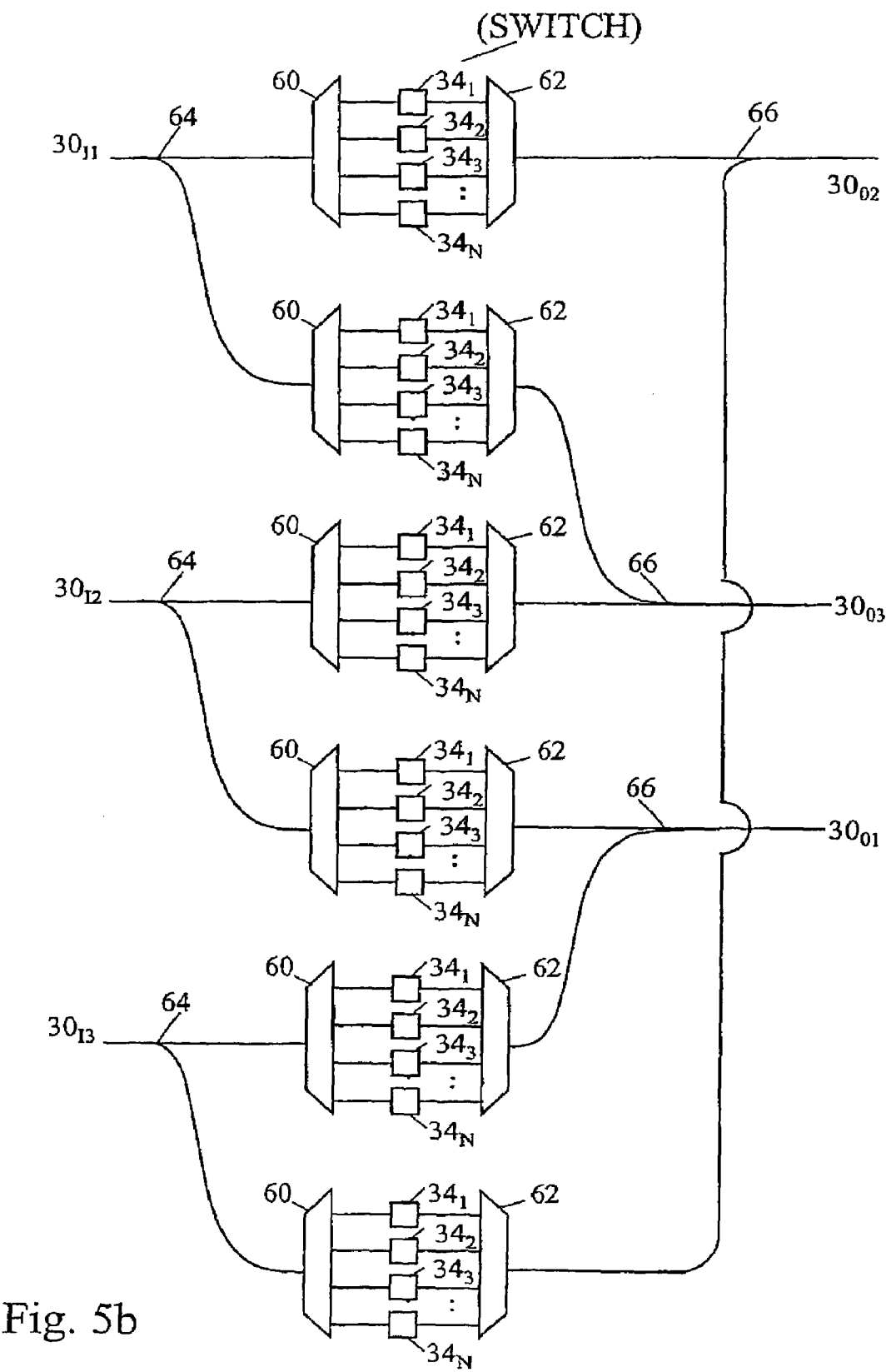
FIGS. 5a–6d illustrate exemplary optical switching devices.

Wavelength selective filters, such as in the '809 patent, can be used to selectively pass or substantially prevent the passage of the individual wavelengths in the input signal. Alternatively, a demultiplexer 60 and multiplexer 62 in combination with non-selective switch elements $34_{ns}$ can be used to selectively pass or substantially prevent the passage of signal groups as shown in FIG. 5b.

Figure 6A:
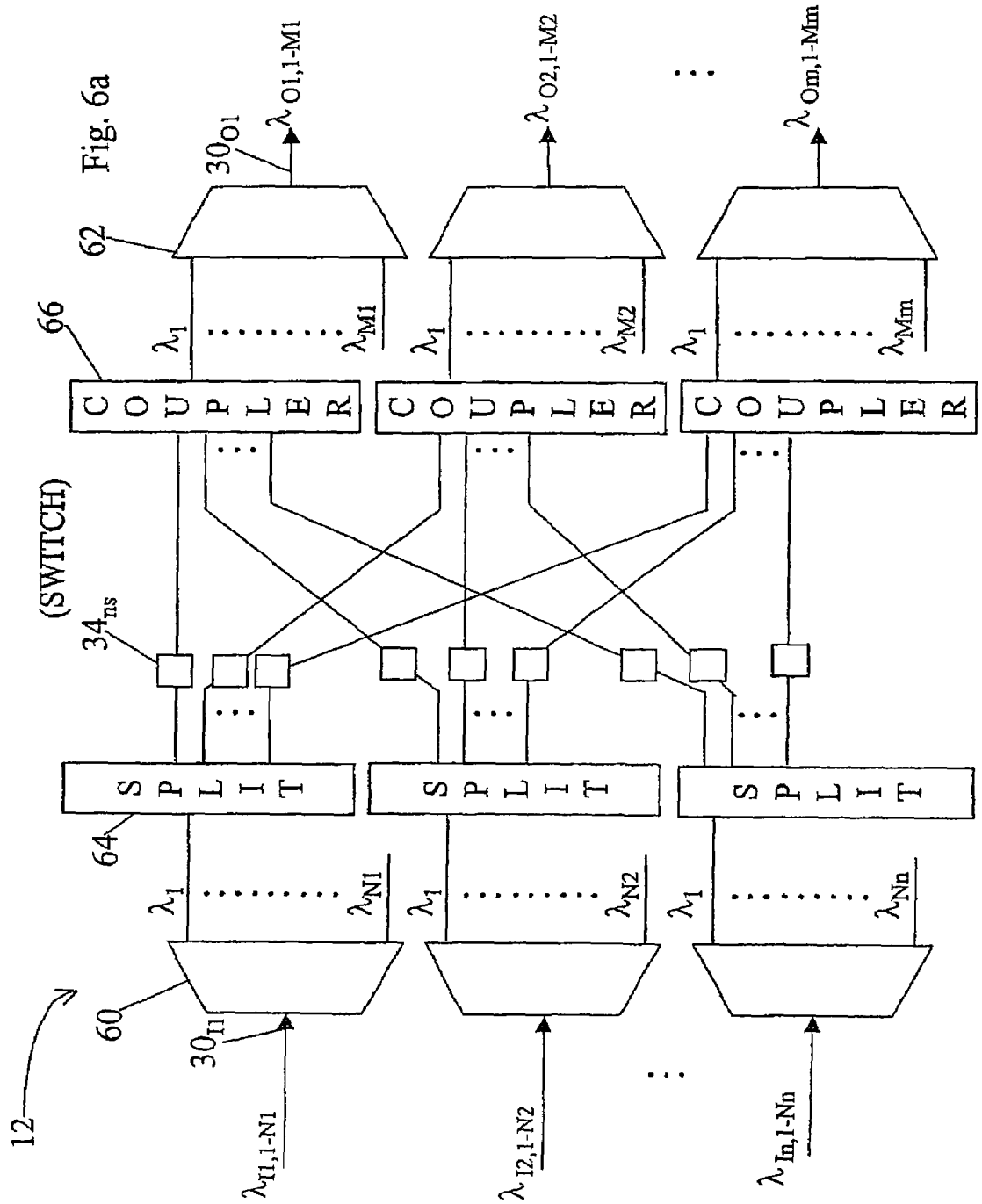

Conversely, in FIG. 6a embodiments of the device 12, demultiplexers 60 can be provided to demultiplex the input signals received from the input ports $30_{Ii}$ into a plurality of signal groups. The signal groups can be split using passive splitters 64 and provided via switch elements 34 and couplers 66 to respective output port $30_o$. The switch elements 34 in these embodiments can be non-selective switch elements $34_{ns}$ or wavelength selective switch elements $34_s$. Additional demultiplexing can be performed after the splitter 64 to further separate the signal groups, if so desired.

Figure 6C:
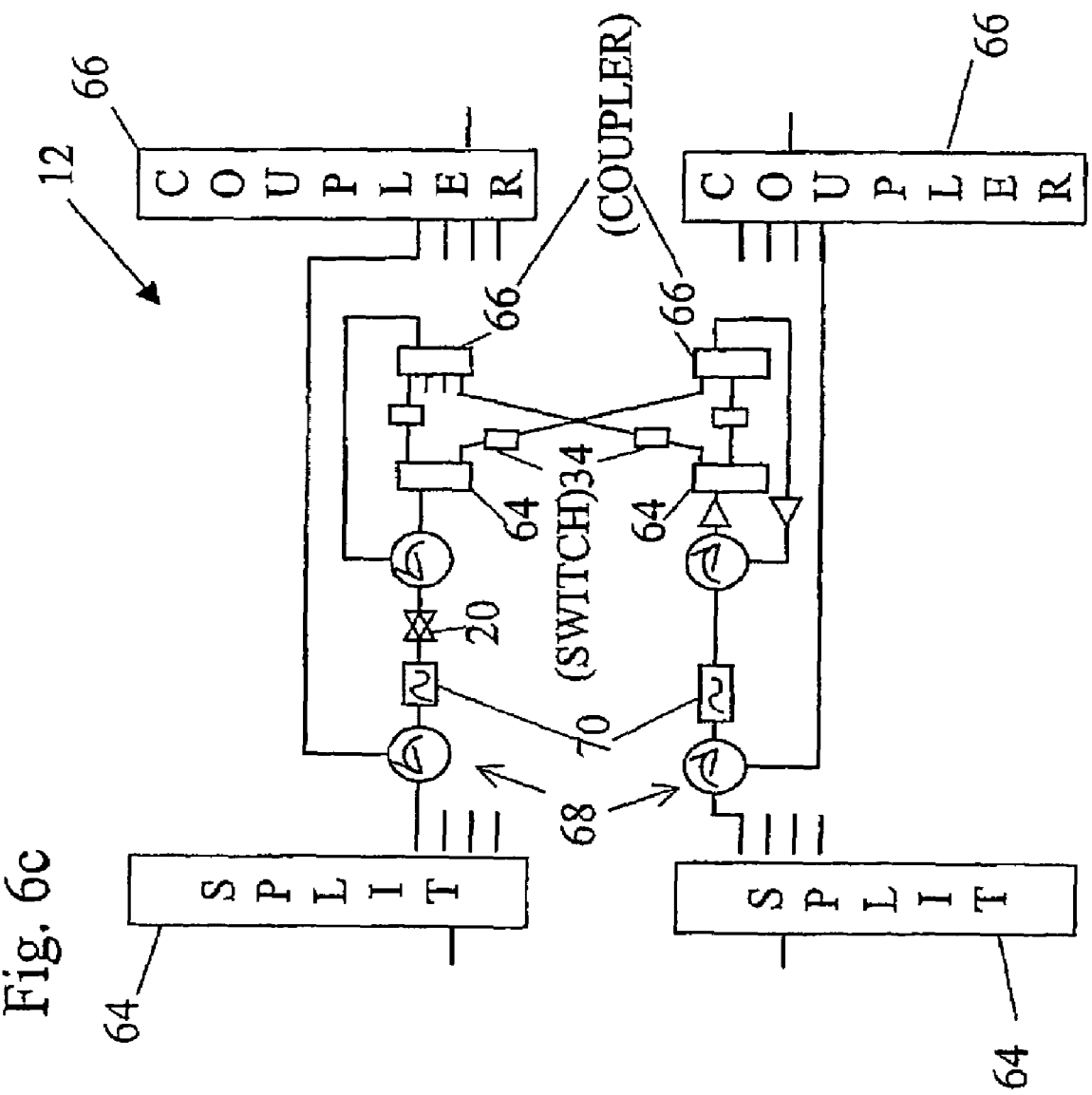

Various other combinations of splitters 64 and demultiplexers 60 and couplers 66 and multiplexers 62 are possible in the present invention. For example, in FIG. 6b embodiments, one or more splitter stages 64 can be used to provide replicate signals corresponding to the number of signal groups. The replicate signals can be split further and provided to selected, or all, output ports of the device 12. In FIG. 6b embodiments, additional amplification may be necessary to overcome the multiple splitting losses in the device 12. In these embodiments, the signal channels can be double passed through one optical amplifier 20 using optical circulators 68 to eliminate the need for separate amplifiers before and after the switch elements, as shown in FIG. 6c. Other multi-port device configurations can be used in lieu of, or combination with the circulator 68 in FIG. 6c embodiments. Also, a signal group filter 70 can be included in the double configuration to increase the rejection of unwanted signal groups.

Figure 6D:
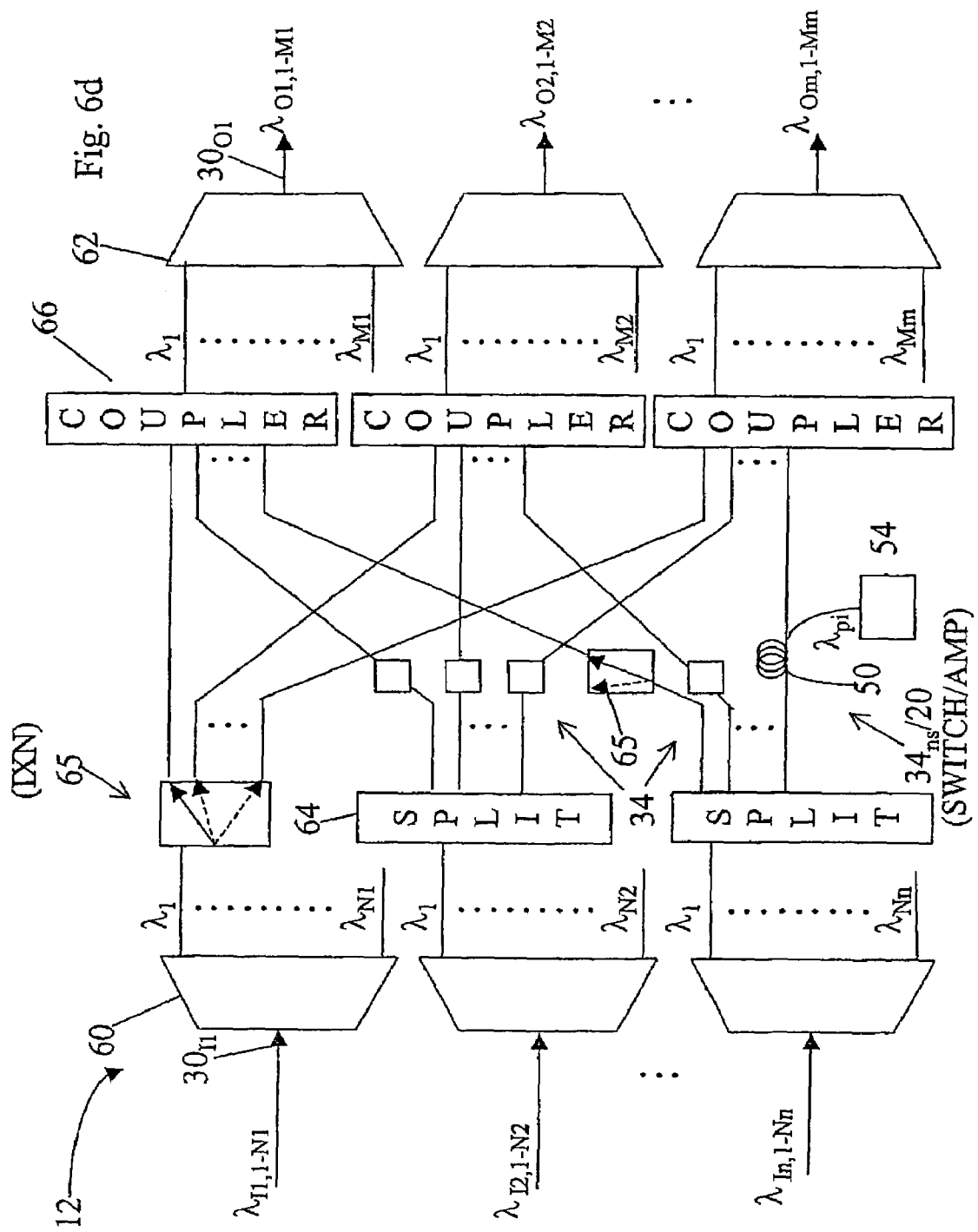
Figure 8A:
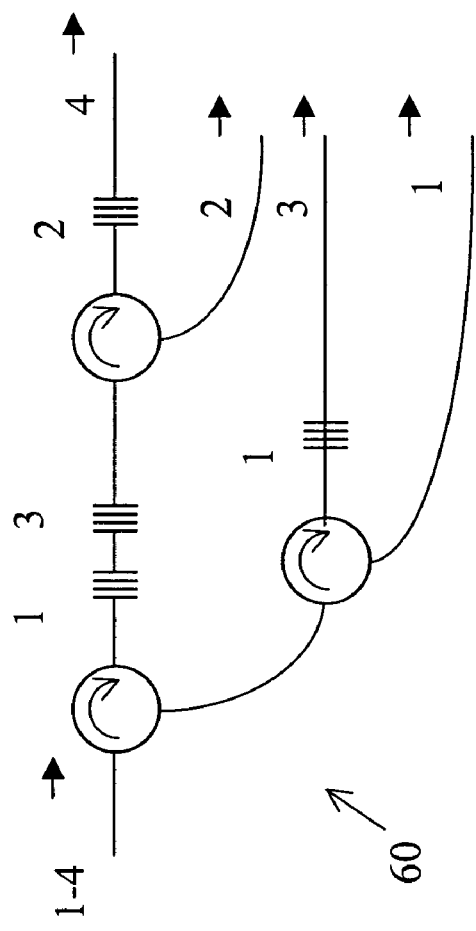
Figure 8B:
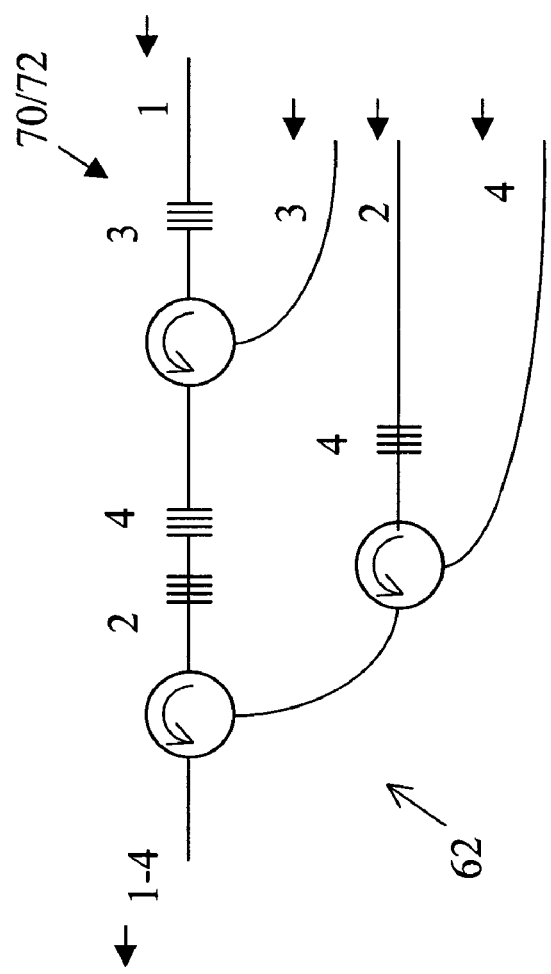
Figure 9A:
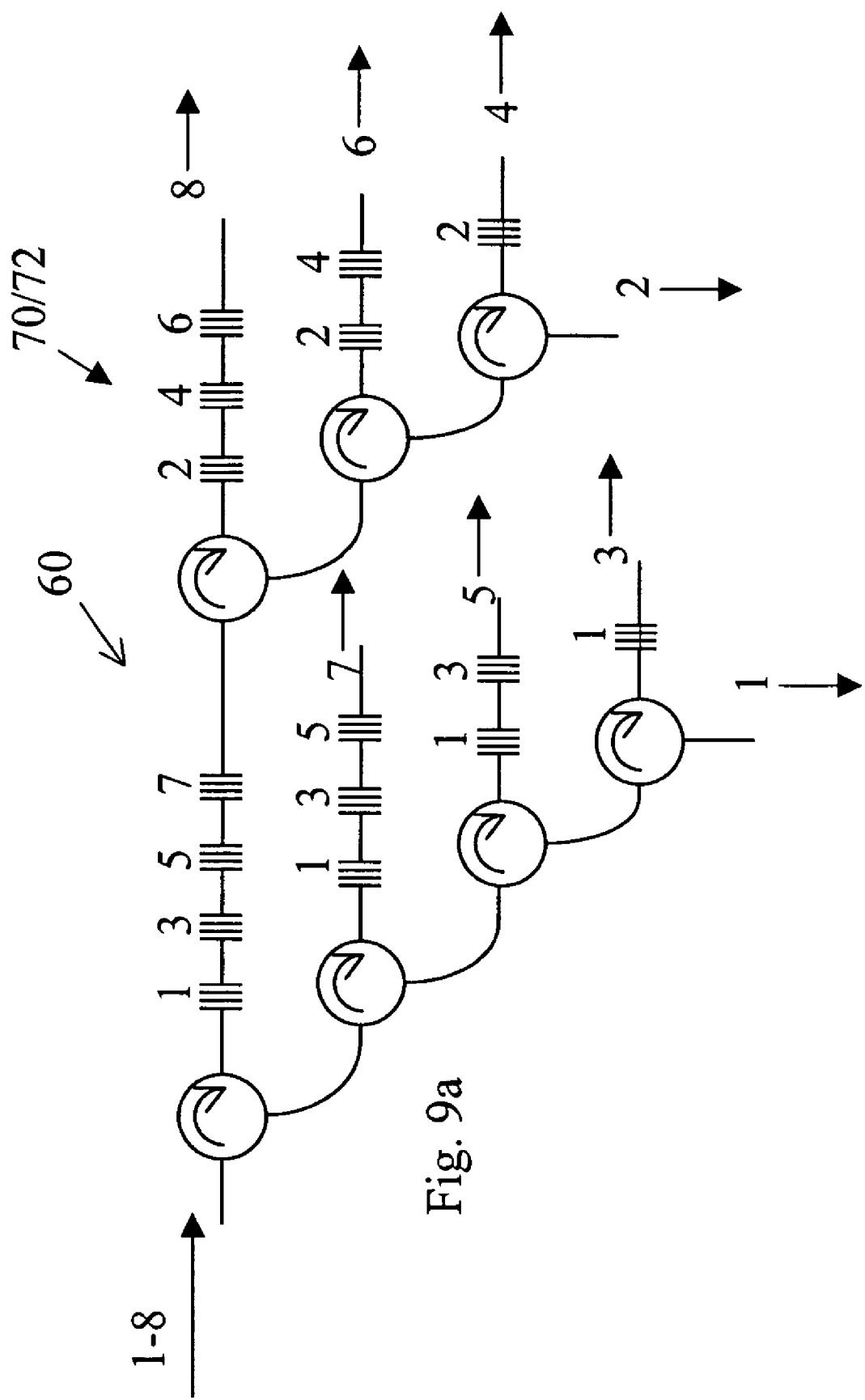
Figure 9B:
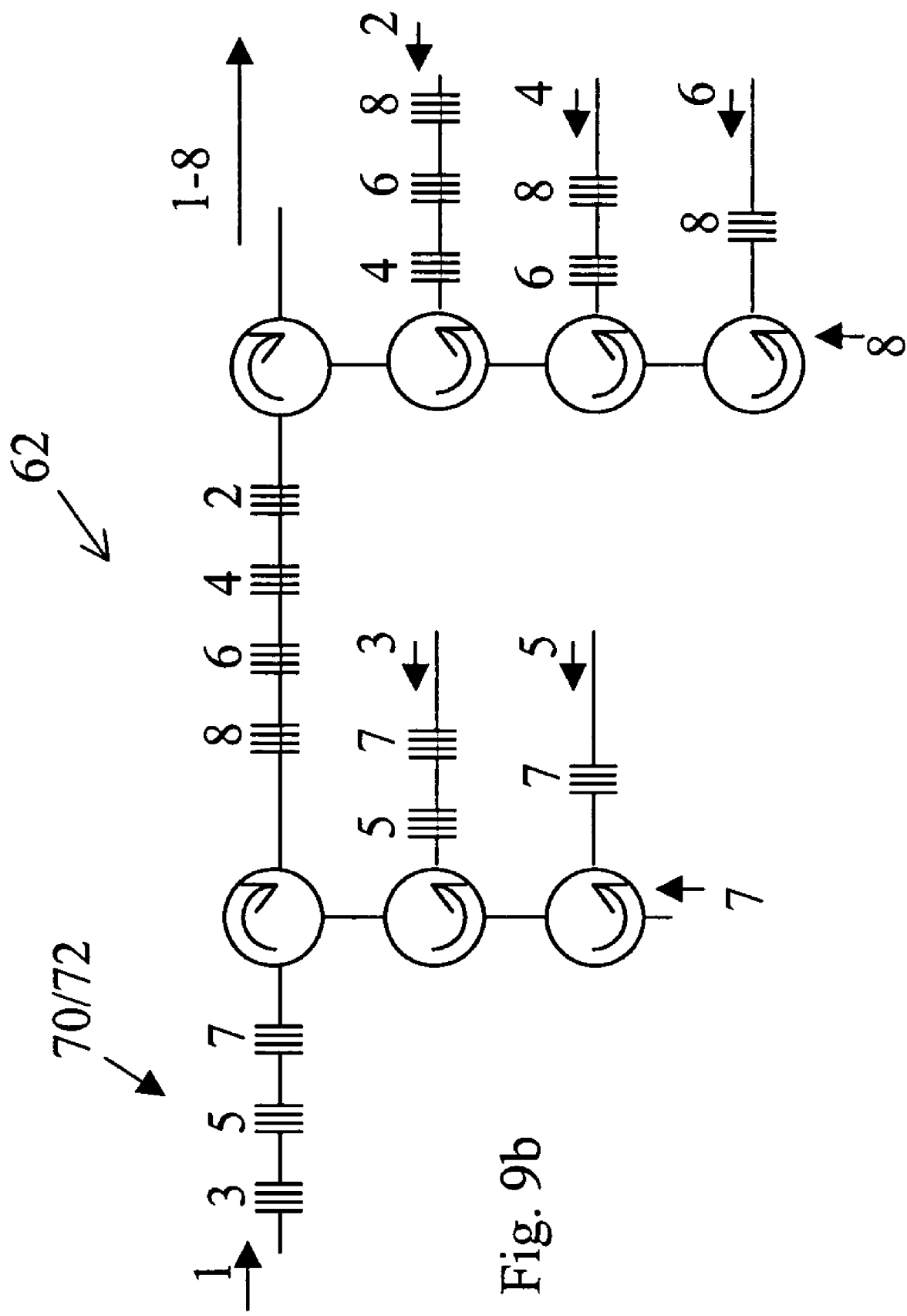

The device 12 can be configured to provide one input port to one output port, multicast, and broadcast switching capabilities. For example, 1×N line switches 65 can be used in lieu of, or in combination with, splitter 64 and switch element 34 embodiments, as shown in FIG. 6d. The line switch 65 is used to selectively direct the entire demultiplexed signal group to only one of the output ports of the device 12. In addition, it is not necessary that each input port $30_i$ be connected to each output port $30_o$ or that only one type of switch element 34 be used in the device 12. In some instance, it may be desirable to provide connectivity between only a subset of the input $30_i$ and output ports $30_o$ or to provide additional ports for future system upgrades.

The distributors 28, switch elements 34, and combiners 26 are selected to provide a substantially uniform optical performance over the signal channel range. When non-selective switch elements $34_{ns}$ are used in the device 12, the optical signals provided to the input port $30_I$ can be demultiplexed into signal groups of a desired optical switching granularity before switching. The non-selective switch element $34_{ns}$ will generally provide a substantially uniform loss over the signal channel range because it either passes or blocks the entire optical signal. Therefore, it is generally necessary to balance the optical loss of the demultiplexer and multiplexer ("demux/mux") over the signal channel range.

In various embodiments, the optical amplifiers 20, associated with the devices 12, as well as variable optical attenuators, can be configured to compensate for non-uniform loss within the device 12. In this manner, the demultiplexer, multiplexer, and switch elements 34 can be optimized for other signal characteristics and the optical amplifiers 20 will balance the overall loss through the device 12. The optical amplifiers 20 can be variously located proximate the demux/mux and switch elements, as described with respect to FIG. 3.

The demux/mux loss can generally be balanced by exposing each wavelength to the same number of band-pass (transmission) filters, as well as the same number of band-stop (reflection) filters; and, thus, the same plural total number of filter stages. The band-pass and band-stop filters can include appropriately configured high-pass or low-pass filters. In addition, it is not necessary that number of pass-band stages be equal to the number of stop-band stages.

FIGS. 7–10 show exemplary demultiplexers and multiplexers that provide for a substantially uniform optical loss across the signal channel range. While FIGS. 7–10 show Bragg gratings as exemplary filters, other filters including those described herein can be substituted as appropriate. Also, the various signal group filters can be the same or different design and can used to filter signal groups that include different number of signal channels.

FIGS. 7a and 7b show linear demultiplexers 60 and multiplexers 62, respectively, for use in the present invention. As shown in FIGS. 7a and 7b, each signal groups 1-N is selectively filtered using a signal group filters 70, such as a Bragg grating 72 and removed via circulator 68. The signal group filters 70 used in the linear configurations are shown as Bragg gratings 72; however, Fabry-Perot filters also can used, as well as WDM couplers, etc., as previously described.

Similarly, FIGS. 8a and 9a and 8b and 9b show parallel demultiplexers 60 and multiplexers 62, respectively, for differing numbers of signal channels or groups of signal channels. The separation of the signal groups in these configurations is performed in parallel, as opposed to serially. While parallel designs are generally more efficient than linear designs, multiple signal group processing in parallel stages can introduce signal cross-talk.

Figure 10A:
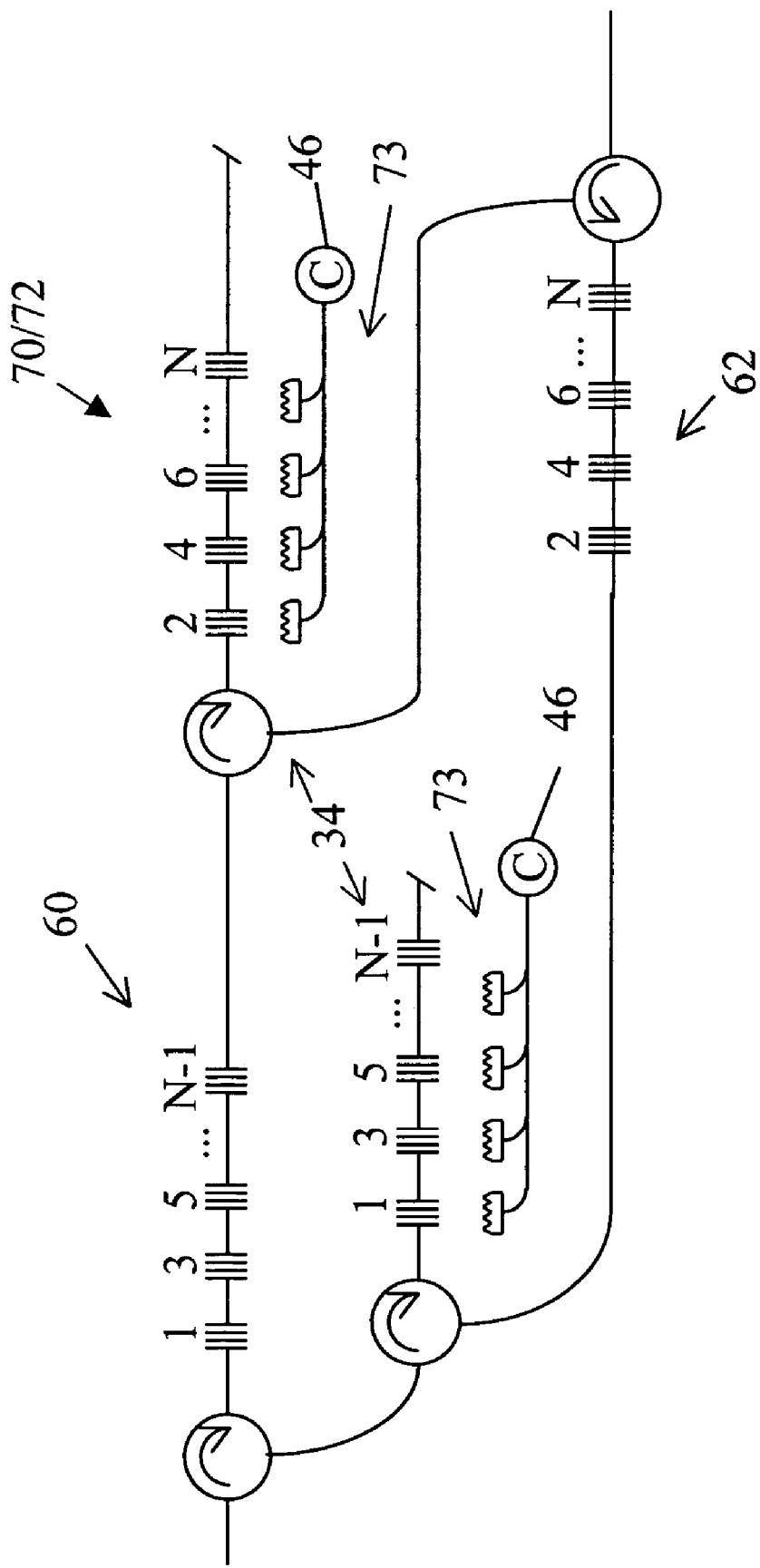
FIGS. 10a–10b illustrate exemplary optical switching devices.
Figure 10B:
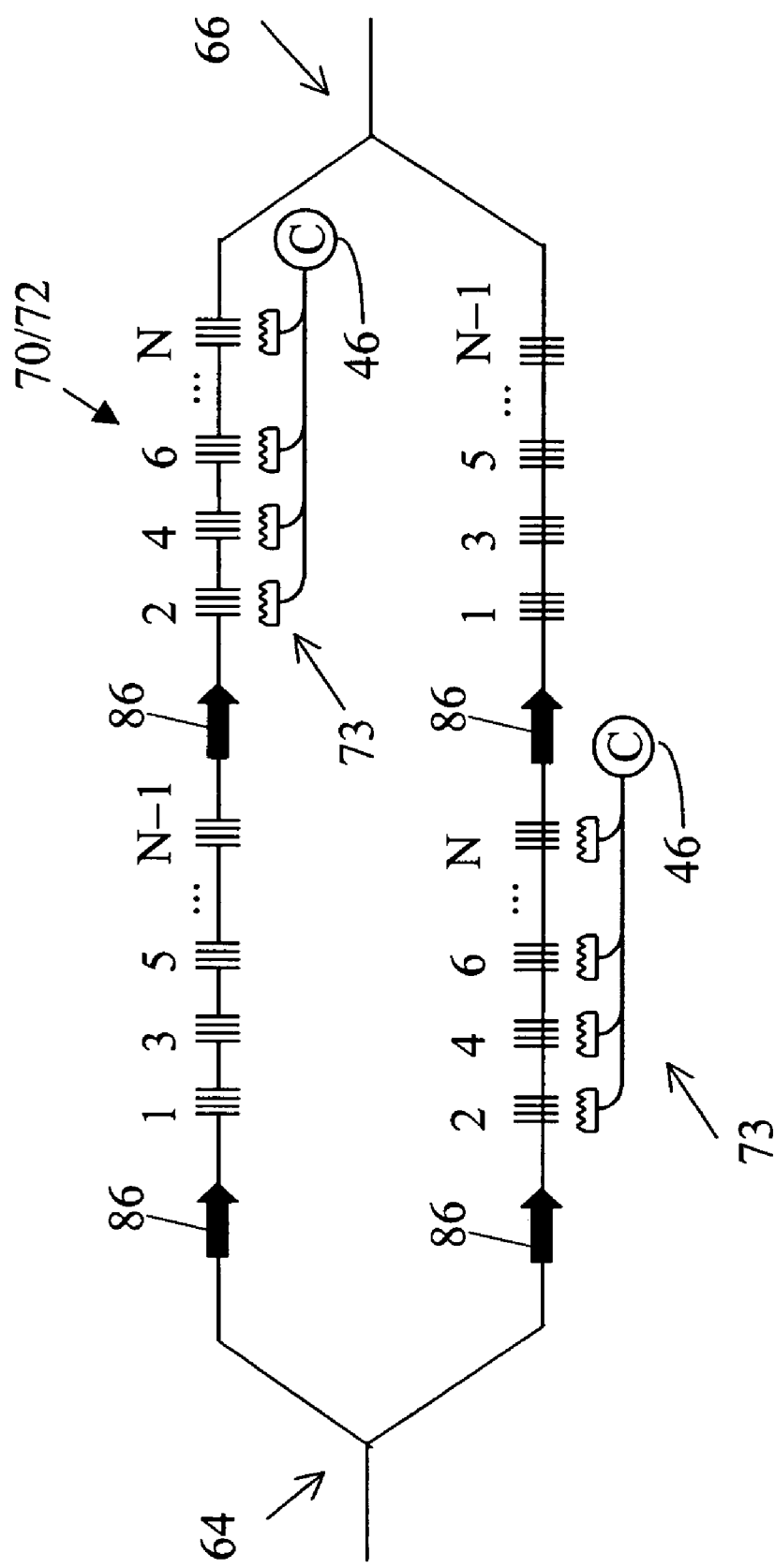

FIGS. 10a and 10b show single stage demultiplexers 60 and multiplexers 62 in combination with wavelength selective switching elements 34. Wavelength controllers 73 are provided to communicate with the central processor 46 and control the wavelength of the filters 70/72 in accordance with switch configurations provided by the network management system 18.

In FIGS. 10a and 10b configurations, both the demux/mux stages are balanced, as well as the switch element 34 stages. Conversely, in various embodiments, wavelength selective switch element stages and the demux/mux stages provide overall balance of the optical switching device 12; however, neither the switch element 34 stages nor the demux/mux stages are separately balanced.

It will be appreciated that wavelengths can be selectively switched in various orders depending upon the system configurations. For example, alternating the wavelengths or wavelength groups switched in each stages can increase the rejection of adjacent wavelengths. Likewise, switching multiple wavelengths or wavelength groups in each stage can be used to minimize the overall loss through the switching elements. In addition, the switching and/or demux configurations can be varied depending upon the wavelengths used in the optical system and the type of wavelength selective devices used. For example, serially connected Bragg gratings can be arranged to reduce cladding mode reflections of shorter wavelengths by longer wavelength gratings that can result in crosstalk interference as will be further discussed.

Bragg grating filters 72 can be reliably manufactured to provide both very narrow (<0.1 nm) and extremely broad wavelength filters (>20 nm) for use in the present invention. Also, the reflective wavelength of Bragg grating filters 72, as well as other filters, often has a temperature dependence that allows the filters 70 to be thermally tuned. However, the temperature dependence also can cause the filter wavelengths to shift undesirably during operation. As such, it is generally necessary to control the temperature of the grating or package the grating such that the thermally variations are offset. Bragg grating packaging generally relies on the additional dependence of Bragg gratings on strain to offset the temperature variations, such as described in U.S. Pat. No. 5,042,898.

In demultiplexers 62 and switch elements 34, it may be necessary to control the temperature or tune numerous signal group filters 70 within the device 12. In various embodiments, wavelength controllers 73 provide temperature control over multiple signal group filters 70, such as Bragg gratings 72, using a common cooling element 74, such as a thermo-electric cooler, and individually heating elements 76. Each filter 70 is surrounded by high thermal conductivity material 78, such as metallic compounds, to ensure good thermal contact with the heating and cooling elements.

Figure 11A:
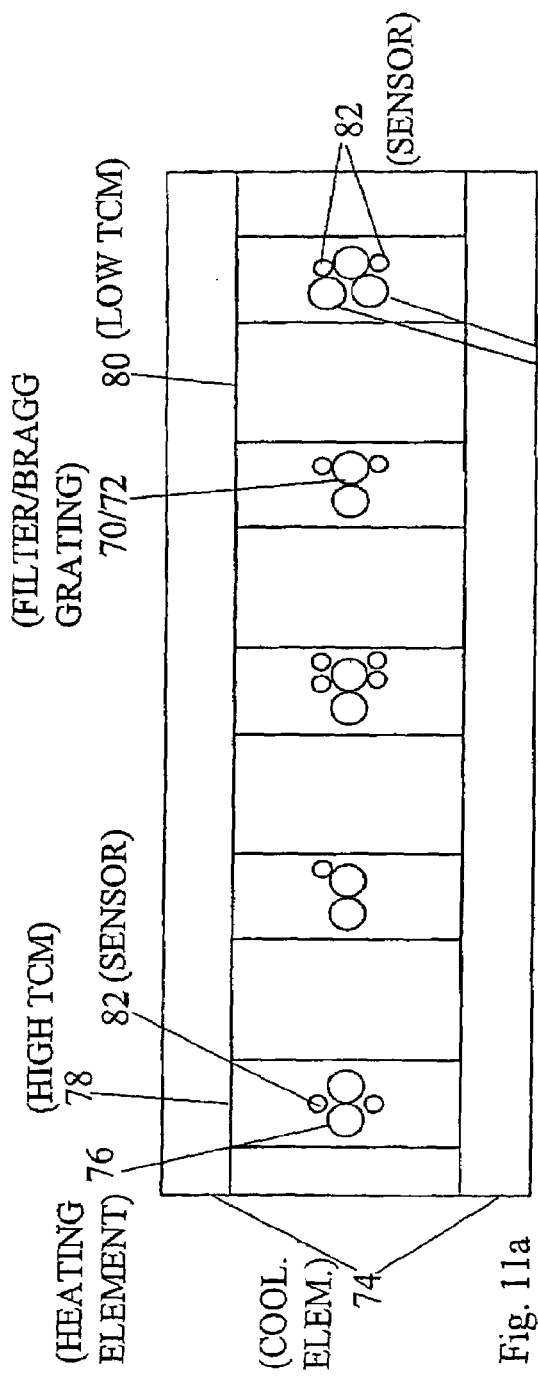
FIGS. 11a–11b illustrate exemplary multiple filter packages.
Figure 11B:
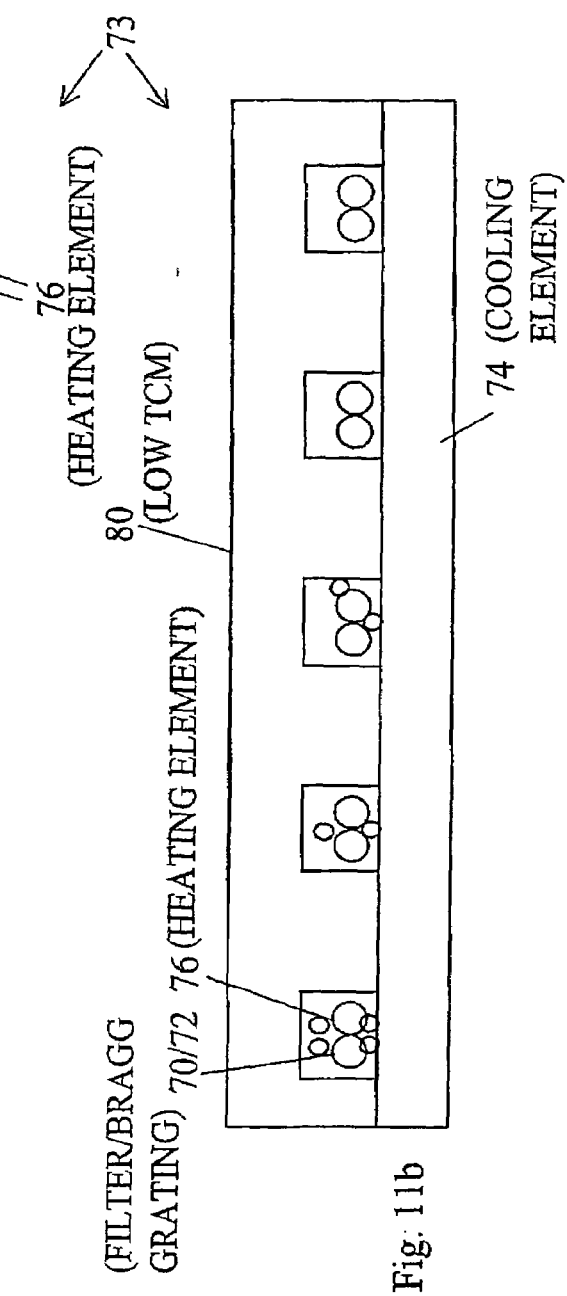

Conversely, adjacent filters 70 are separated by low thermal conductivity material 80, such as polymers, etc. to thermally isolate each filter 70, thereby allowing individual temperature control via the heating elements 76. One or more temperature sensors 82, such as thermocouples and thermistors, can be provided adjacent to the filters 70 to monitor the temperature and provide for feedback control of the heating elements 76 and/or cooling elements 74. FIGS. 11a and 11b illustrate cross-sectional, side views of two parallel filter packages. FIG. 11a embodiments provide for redundant cooling elements on opposite sides of the filter 70. Whereas, in FIG. 11b embodiment, one directional heat transfer via the high thermal conductivity material 78 is provided to the cooling element 74, which also can be deployed in a redundant configuration.

Various non-selective switch elements $34_{ns}$ can be used in present invention, such as mechanical line and micro-mirror ("MEM") switches, liquid crystal, magneto-optic, thermo-optic, acousto-optic, electro-optic, semiconductor amplifier, etc., as well as erbium doped fiber amplifier switch elements previously described. Alternatively, the switch elements 34 can employ wavelength selective multi-port devices and filters, such as WDM couplers, circulators, Bragg gratings, Mach-Zehnder, Fabry-Perot and dichroic filters, as shown in the exemplary embodiments of FIG. 10. As previously described, the switch element 34 can be configured strictly as on/off gates and/or variable attenuating on/off gates. For example, the nonselective switch 65 shown in FIG. 6b can be embodied as any of the foregoing switch types, and can include an optical attenuator to control the signal power.

It is generally desirable to use a switch element 34 that has a high extinction ratio, e.g., >40 dB, to substantially prevent the passage of a signal through the switch in the off position. Signal leakage through switches in the off position can severely degrade signals passing through the device 12 by causing crosstalk interference between the signals. Lower extinction ratio, <40 dB, switch elements 34 that significantly attenuate can be deployed in various configurations depending upon the system configuration.

The extinction ratio required to prevent significant system performance degradation from cross-talk interference depends, in part, on the system configuration. For example, lower extinction ratio switch elements 34 may be sufficiently effective to prevent significant crosstalk degradation of the signals, when there are no other sources of significant crosstalk in the system. Conversely, when multiple devices 12 or other potential sources of crosstalk, such as mux/demux configurations, are concatenated, the extinction ratio of the devices 12 generally has to be higher to prevent an unacceptable cumulative crosstalk degradation of the system performance.

In the present invention, low extinction ratio switch elements, such as a thermo-optic and electro-optic switches, as well as wavelength selective switches with low extinction ratios, e.g., <99% reflective, can be configured to provide higher extinction ratio devices. As shown in FIG. 12, the switch element 34 includes a low extinction ratio on/off switch element $34_1$, such as a variable optical attenuator, that is serially connected to a saturable absorber 84. The saturable absorber 84 is designed to absorb low levels of optical energy characteristic of optical signal leakage, when non-selective switch element $34_1$ is in the off configuration. However, the saturable absorber 84 is further designed to saturate at higher levels of optical energy, thereby allowing the remaining optical energy in the optical signal to pass through the switch element 34. Suitable saturable absorbers for use in the present invention include erbium doped fiber, semiconductor amplifiers, or other saturable media.

Lower extinction ratio switch elements 34 also can be embodied as 2×2 crossbar switch having an input port (In) and an output port (Out) alternately connected to first and second input/output ports, $In/Out_1$ and $In/Out_2$, respectively. The first and second input/output ports are optically connected via an optical fiber path 16. An optical isolator 86 is provided in the path 16 to prevent optical energy from passing from the second input/output port to the first input/output port. In a first ("on") switch configuration shown in FIG. 13a, the optical signal passes from the input port through the first crossbar $88_1$, the first and second input/output port, the second crossbar $88_2$, and exits the switch element 34 via the output port. In a second ("off") configuration, shown in FIG. 13b, the optical signal passes from the input port through the first crossbar 88₁ and the second-input/output port and is prevented from reaching the first input/output port by the isolator 86. Any signal leakage from the input port to the first input/output port will be further attenuated by the leakage path, shown as dashed lines, from the second input/output port to the output port of the switch 34.

Figure 14:
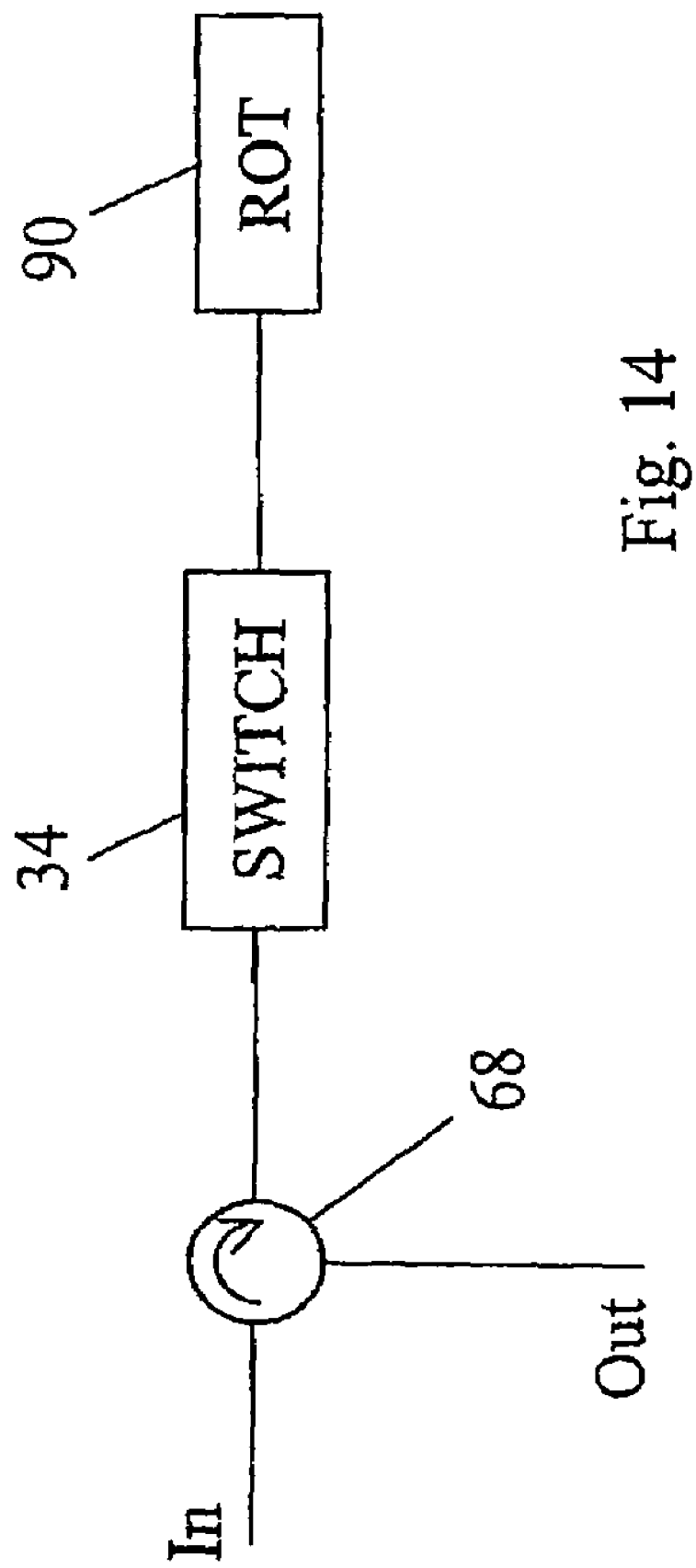

Various switching elements, such as liquid crystal switches, can have polarization dependent extinction ratios that can introduce varying amounts of crosstalk into the system 10. FIG. 14 illustrates embodiments of the present invention to decrease the polarization dependence of those switch elements 34. Signals passing through the switch element 34 are reflected by a Faraday rotator 90, which also rotates the polarization of the signals. The polarization rotated signal pass through the switch element 34 a second time, so that each portion of the signal has passed through the switch element in both polarizations. In these embodiments, not only can the polarization dependence of the overall be eliminated, but the device has an effective extinction ratio that is higher than a single pass through the switch element 34.

In the operation of the present invention, input signals including one or more signal channels are provided to the device 12 at various input ports from various transmitters in the system 10. The device 12 is configured to selectively switch the signal channels in signal groups including one or more signal channels to output ports leading to receivers at the signal destination. The device 12 balances the optical signal characteristics through the device, such that signal channels combined from various input ports have substantially equal signal characteristics including signal power, cross-talk noise, etc.

Those of ordinary skill in the art will appreciate that numerous modifications and variations can be made to specific aspects of the present invention without departing from the scope of the present invention. It is intended that the foregoing specification and the following claims cover such modifications and variations.

What is claimed is:

1. An optical transmission system comprising:
   at least one optical transmitter configured to transmit at least one optical signal channel via an optical signal along an optical path;
   at least one optical receiver configured to receive at least one optical signal channel from said optical path; and,
   an optical switching device disposed along said optical path including:
   a demultiplexer configured to demultiplex the optical signal provided to an input port into a plurality of signal groups, each signal group including at least one signal channel,
   a switch element configurable to pass or prevent the passage of at least one of the signal groups and variably control the optical power of the signal groups passing though said switch element, and
   a multiplexer configured to multiplex the signal groups passed by said switch element into an output signal through an output port in optical communication with said optical receiver, wherein said optical switching device imparts a substantially uniform optical loss across the at least one optical signal channels;
   a distributor connected along the optical path at an input port of the demultiplexer;
   at least one drop receiver connected to an output port of the distributor;
   a combiner connected along the optical oath at an output port of the multiplexer; and
   at least one add transmitter connect to an input port of the combiner.

2. The optical transmission system of claim 1, wherein the switch element is configured to block wavelengths that are being dropped.

3. The optical transmission system of claim 2, wherein the switch element is configured to block a signal group comprising a plurality of wavelengths, wherein at least one of the wavelengths in the signal group is being dropped.

4. The optical transmission system of claim 2, wherein the switch element is configured to block wavelengths that are being added.

5. The optical transmission system of claim 1, wherein the distributor is wavelength-selective and provides to the receiver only signals being dropped.

6. The optical transmission system of claim 1, wherein the at least one add transmitter and the at least one drop receiver are remotely located from the switching device.

7. The optical transmission system of claim 1, wherein the at least one drop receiver and the at least one add transmitter are connected to a local optical transmission system.

8. The optical transmission system of claim 7, wherein:
   at least one drop receiver is located in the local optical transmission system remote from the switching device; and
   at least one add transmitter is located in the local optical transmission system remote from the switching device.

9. The optical transmission system of claim 1, wherein:
   the at least one drop receiver is a tunable receiver; and
   the at least one add transmitter is a tunable transmitter.

10. The optical transmission system of claim 1, wherein at least one of the demultiplexer, mulliplexer and optical switching clement imparts a non-unifonn optical loss across the optical channel that is balanced by at least one of the demultiplexer, multiplexer and optical switching element to impart the substantially uniform optical loss across the optical channels passing through the optical switching device.

11. The optical transmission system of claim 10, wherein the optical switching device includes at least one optical amplifier disposed between the demultiplexer and the multiplexer to at least partially balance the non-uniform optical loss imparted by at least one of the demultiplexer, multiplexer and optical switching element.

12. An optical transmission system comprising:
   at least one optical transmitter configured to transmit at least one optical signal channel via an optical signal along an optical path;
   at least one optical receiver configured to receive at least one optical signal channel from said optical path; and,
   an optical switching device disposed along said optical path including:
   a demultiplexer configured to demultiplex the optical signal provided to an input port into a plurality of signal groups, each signal group including at least one signal channel,
   a switch element configurable to pass or prevent the passage of at least one of the signal groups and variably control the optical power of the signal groups passing through said switch element, and
   a multiplexer configured to multiplex the signal groups passed by said switch element into an output signal through an output port in optical communication with said optical receiver, wherein said optical switching device imparts a substantially uniform optical loss across the at least one optical signal channels;

a distributor having an input port and a plurality of output ports and configured to distribute an optical add signal provided at the input port into a plurality of optical signals at the output ports, wherein at least one output port from the distributor is connected to at least one input port of the multiplexer via at least one switch element;

a combiner having a plurality of input ports and an output port and configured to combine optical signals provided at the input ports into at least one optical drop signal at the output port, wherein at least one input port to the combiner is connected to at least one output port from the demultiplexer via at least one switch element.

13. The optical transmission system of claim 12, wherein the distributor is a demultiplexer.

14. The optical transmission system of claim 13, wherein the input port of the distributor and the output port of the combiner are connected to a local optical transmission system.

15. The optical transmission system of claim 14, wherein the distributor and the combiner form a portion of an add/drop multiplexer in the local optical transmission system.

16. The optical transmission system of clam 14, wherein the at least one output port of the distributor connected to the at least one input port of the combiner forms a through path in the local optical transmission system.

17. The optical transmission system of claim 14, further comprising a transmitter connected to the input port of the distributor, wherein the transmitter is located in the local optical transmission system and is remote from the switching device.

18. The optical transmission system of claim 17, further comprising a receiver connected to the output port of the combiner, wherein the receiver is located in the local optical transmission system and is remote from the switching device.

19. The optical transmission system of claim 12, wherein at least one output port of the distributor is connected to at least one input port of the combiner.

20. An optical switching device comprising:

a demultiplexer including an input port and a plurality of output ports, wherein the demultiplexer is configured to demultiplex an, optical signal provided to the input port into a plurality of signal groups at the output ports, each signal group including at least one signal channel, a switch element configurable to pass or prevent the passage of at least one of the signal groups and variably control optical power of the signal groups passing through said switch element, and a multiplexer configured to multiplex the signal groups passed by said switch element into an output signal through an output port, wherein said optical switching device imparts a substantially uniform optical loss across the at least one optical signal channels;

a distributor connected at the input port of the demultiplexer;

at least one drop receiver connected to an output port of the distributor;

a combiner connected at the output port of the multiplexer; and at least one add transmitter connect to an input port of the combiner.

* * * * *